(12) United States Patent
Matharu

(10) Patent No.: US 7,170,864 B2
(45) Date of Patent: Jan. 30, 2007

(54) SYSTEM AND METHOD FOR WAP SERVER MANAGEMENT USING A SINGLE CONSOLE

(75) Inventor: Tarlochan S. Matharu, San Ramon, CA (US)

(73) Assignee: BMC Software, Inc., Houston, TX (US)

( * ) Notice: Subject to any disclaimer, the term of this patent is extended or adjusted under 35 U.S.C. 154(b) by 662 days.

(21) Appl. No.: 10/093,941

(22) Filed: Mar. 8, 2002

(65) Prior Publication Data

US 2002/0129136 A1 Sep. 12, 2002

Related U.S. Application Data

(60) Provisional application No. 60/274,534, filed on Mar. 8, 2001.

(51) Int. Cl.
G09G 5/10 (2006.01)
G06F 15/16 (2006.01)

(52) U.S. Cl. .................... 370/310; 455/3.01; 709/203

(58) Field of Classification Search ............... 709/203; 370/310; 455/3.01
See application file for complete search history.

(56) References Cited

U.S. PATENT DOCUMENTS

| | | | |
|---|---|---|---|
| 6,336,137 B1 * | 1/2002 | Lee et al. ................. 709/219 |
| 6,356,529 B1 * | 3/2002 | Zarom ..................... 370/231 |
| 6,418,146 B1 * | 7/2002 | Miloslavsky ............. 370/400 |
| 6,490,291 B1 * | 12/2002 | Lee et al. ................. 370/401 |
| 6,658,251 B1 * | 12/2003 | Lee et al. ................. 370/328 |
| 6,738,614 B1 * | 5/2004 | Blankenship et al. .... 455/414.4 |
| 6,738,808 B1 * | 5/2004 | Zellner et al. ............ 709/223 |
| 6,799,203 B2 * | 9/2004 | Oommen .................. 709/219 |
| 6,865,171 B1 * | 3/2005 | Nilsson ................... 370/338 |
| 6,895,425 B1 * | 5/2005 | Kadyk et al. ............. 709/203 |
| 2001/0032254 A1 * | 10/2001 | Hawkins ................... 709/219 |
| 2002/0068554 A1 * | 6/2002 | Dusse ...................... 455/419 |
| 2002/0091527 A1 * | 7/2002 | Shiau ...................... 704/270.1 |

* cited by examiner

Primary Examiner—Krisna Lim
(74) Attorney, Agent, or Firm—Wong, Cabello, Lutsch, Rutherford & Brucculeri, LLP

(57) ABSTRACT

An improved method and system for WAP server management using a single console. A plurality of servers for wireless communication may provide wireless services to one or more clients using a wireless protocol (e.g., WAP). A management console coupled to the plurality of servers may provide integrated management of the plurality of servers. Each agent of a plurality of agents may execute on a corresponding server of the plurality of servers. Each agent may gather information about execution of the respective server and/or execution of the wireless services provided by its respective server. Each agent may provide the gathered information to the management console. The management console may display the gathered information in a number of user-configurable ways (e.g., aggregate information regarding the execution of the plurality of servers, individualized information regarding the execution of individual servers of the plurality of servers.

27 Claims, 31 Drawing Sheets

, "NWS_LOGS" on "172.20.41.76"

| Item | Value |
|---|---|
| History Retention: | 1 day(s) |
| Worst Parameter: | |
| Default username: | |
| Application class: | NWS_LOGS |
| State: | OK |
| Icon type: | Application |
| ✓ Access Log Filesize | 10240 |
| ✓ AccessLog FileName | access |
| ✓ AdminLog File Name | admin |
| ✓ AdminLog File size | 10240 |
| ✓ BearerLog File Name | bearer |
| ✓ BearerLog File size | 10240 |
| ✓ ErrorLog File Name | error |
| ✓ ErrorLog File size | 10240 |
| ✓ KM Version | Ver: 1.0 |
| ✓ ServletLog File Name | servlet |
| ✓ ServletLog File size | 10240 |

[ OK ]   [ Update ]   [ Help ]

*FIG. 30*

SYSTEM AND METHOD FOR WAP SERVER MANAGEMENT USING A SINGLE CONSOLE

CROSS-REFERENCE TO RELATED APPLICATIONS

This application claims benefit of priority of provisional application Ser. No. 60/274,534 entitled "System and Method for WAP Server Management Using a Single Console" and filed Mar. 8, 2001, whose inventor is Tony Matharu.

BACKGROUND OF THE INVENTION

1. Field of the Invention

The present invention relates to wireless communication, and more particularly to integrated management of a plurality of servers that provide wireless services to clients.

2. Description of the Related Art

Wireless application protocol (WAP) is an application environment and a set of communication protocols for wireless devices which enables access to the Internet and advanced telephony services. WAP bridges the gap between the mobile world and the Internet as well as corporate intranets and offers the ability to deliver mobile value-added services to subscribers, independent of their network, bearer, and terminal. Mobile subscribers may access the same wealth of information from a pocket-sized device as they can from the desktop.

WAP is optimized for low-bandwidth, low-memory, and low-display capability environments. These types of environments include PDAs, wireless phones, pagers, and virtually any other communications device.

WAP is a global standard and is not controlled by any single company. Ericsson, Nokia, Motorola, and Phone.com (formerly Unwired Planet) founded the WAP Forum in the summer of 1997 with the initial purpose of defining an industry-wide specification for developing applications over wireless communications networks. The WAP specifications define a set of protocols in application, session, transaction, security, and transport layers, which enable operators, manufacturers, and applications providers to meet the challenges in advanced wireless service differentiation and fast/flexible service creation. Since the WAP Forum was founded, hundreds of member companies have joined. The newer members of the WAP Forum represent a wide range of segments of the wireless communication industry, including: terminal and infrastructure manufacturers, operators, carriers, service providers, software houses, content providers, and companies developing services and applications for mobile devices.

According to the WAP Forum, the goals of WAP are to be: (1) independent of wireless network standard; (2) open to all; (3) proposed to the appropriate standards bodies; (4) scalable across transport options; (5) scalable across device types; (6) extensible over time to new networks and transports. As part of the Forum's goals, WAP will also be accessible to (but not limited to) the following: GSM-900, GSM-1800, GSM-1900, CDMA IS-95, TDMA IS-136, 3G systems-IMT-2000, UMTS, W-CDMA, Wideband IS-95.

WAP client applications make requests very similar in concept to the URL concept in use on the Web. A WAP request is routed through a WAP gateway which acts as an intermediary between the "bearer" used by the client (GSM, CDMA, TDMA, etc.) and the computing network that the WAP gateway resides on (TCP/IP in most cases). The gateway then processes the request, retrieves contents or calls CGI scripts, Java servlets, or some other dynamic mechanism, then formats data for return to the client. This data is formatted as WML (Wireless Markup Language), a markup language based directly on XML (Extensible Markup Language). Once the WML has been prepared (known as a deck), the gateway then sends the completed request back (in binary form due to bandwidth restrictions) to the client for display and/or processing. The client retrieves the first card off of the deck and displays it on the monitor.

The deck of cards metaphor is designed specifically to take advantage of small display areas on handheld devices. Instead of continually requesting and retrieving cards (the WAP equivalent of HTML pages), each client request results in the retrieval of a deck of one or more cards. The client device may employ logic via embedded WMLScript (the WAP equivalent of client-side JavaScript) for intelligently processing these cards and the resultant user inputs.

It is vital for organizations with deployed WAP server technology to have the ability to easily and cost effectively monitor these systems. Globally, the volume of sales of all types of goods and services completed via e-commerce (electronic commerce) and m-commerce (mobile-commerce) is on the rise, and is expected to continue to grow. Similarly, an increasing number of mobile devices (e.g., mobile phones, pagers, PDAs) are web-enabled, thus the demand for seamless, reliable WAP Server service is crucial to the success of any organization wishing to stake their claim in this growing industry.

For the foregoing reasons, there is a need for a system and method for WAP server management using a single console to integrate management of a plurality of servers for wireless communication.

SUMMARY OF THE INVENTION

The present invention provides various embodiments of a system, method, and medium for WAP Server Management Using a Single Console.

In one embodiment, a plurality of servers for wireless communication may provide wireless services to one or more clients using a wireless protocol. A management console coupled to the plurality of servers may provide integrated management of the plurality of servers. The wireless protocol may be the Wireless Application Protocol (WAP).

Additionally, a plurality of agents may exist. Each agent of the plurality of agents may execute on a corresponding server of the plurality of servers. Each agent may gather information about execution of the respective server. After gathering the information, each agent may provide the gathered information about execution of the respective server to the management console. The management console may display the execution of the respective server information gathered from each agent in a number of user-configurable ways. For example, the management console may display aggregate information regarding the execution of the plurality of servers. In another example, the management console may display information regarding the execution of individual servers of the plurality of servers.

Further, each agent may gather information about execution of the wireless services provided by its respective server. After gathering the information, each agent may provide the gathered information about execution of the wireless services provided by its respective server to the management console. The management console may display the information regarding the wireless services provided by each respective server, gathered from each corresponding agent, in a number of user-configurable ways. For example, the management console may display aggregate information regarding wireless services provided by the plurality of servers. In another example, the management console may display information regarding the wireless services provided by individual servers of the plurality of servers.

BRIEF DESCRIPTION OF THE DRAWINGS

A better understanding of the present invention can be obtained when the following detailed description of several embodiments is considered in conjunction with the following drawings, in which:

FIG. 8 is a screenshot of a log query dialog for a servlet log according to one embodiment;

FIG. 24 is a screenshot of an event manager log according to one embodiment;

FIG. 30 is a screenshot listing various log parameters for NWS_LOGS according to one embodiment;

Figure 1:
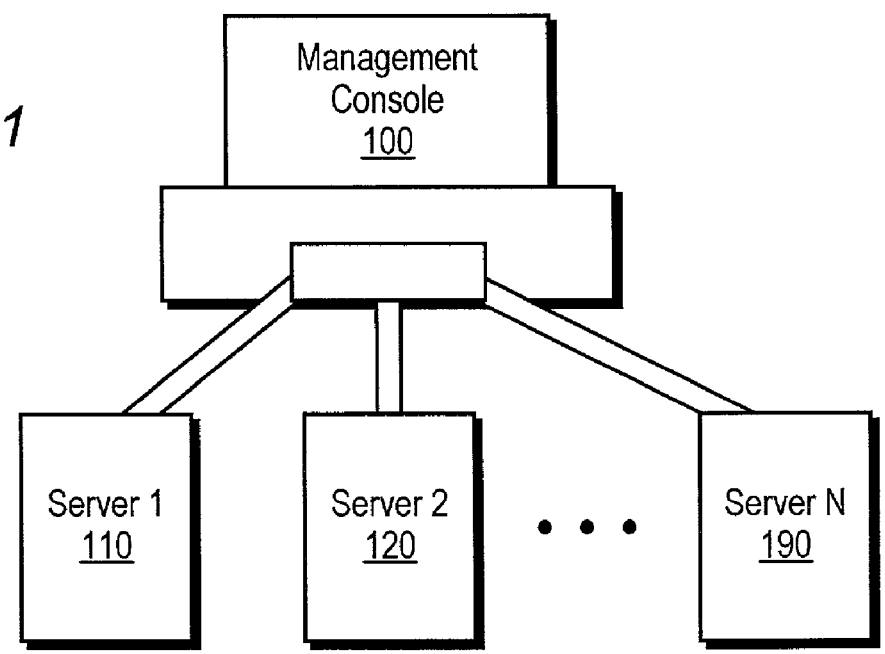
FIG. 1 illustrates a management console connected to a plurality of servers according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

U.S. provisional application Ser. No. 60/274,534 titled "System and Method for WAP Server Management Using a Single Console" filed Mar. 8, 2001, whose inventor is Tony Matharu, is hereby incorporated by reference in its entirety as though fully and completely set forth herein.

FIG. 1—Management Console and Servers

FIG. 1 illustrates one embodiment of a management console connected to a plurality of servers. In one embodiment, a management console 100 may be coupled to a plurality of servers 110, 120, . . . , 190, as shown. The plurality of servers 110, 120, . . . , 190 may communicate with and provide wireless services to one or more clients using a wireless protocol (e.g., Wireless Application Protocol (WAP)), not shown. The management console 100 may provide integrated management of the plurality of servers. In one embodiment, the management console 100 may be a PATROL Management Console, a product of BMC Software, Inc.

Examples of wireless services provided by the plurality of servers may include, but are not limited to: mobile commerce (m-commerce), procurement, account access (e.g., from banks or other financial service institutions), warehouse inventory applications, package delivery applications, voice access to web data.

Examples of integrated management of the plurality of servers may include, but are not limited to: log management, bearer management, server access management, display topology of the server components, display server attributes, start and stop server traffic, start the WAP server and recovery routine, restart WAP servers running on the same host as the agent, shut down the server, view and alter the server settings for session and thread settings, view and alter the server settings for thread pool and session cache size, cleanup session data kept in the WAP server database, view and install new server licenses, view statistical counters maintained by the server and gathered by a knowledge module (KM), enable snapshot logging of server statistical counters to the access log.

Figure 2:
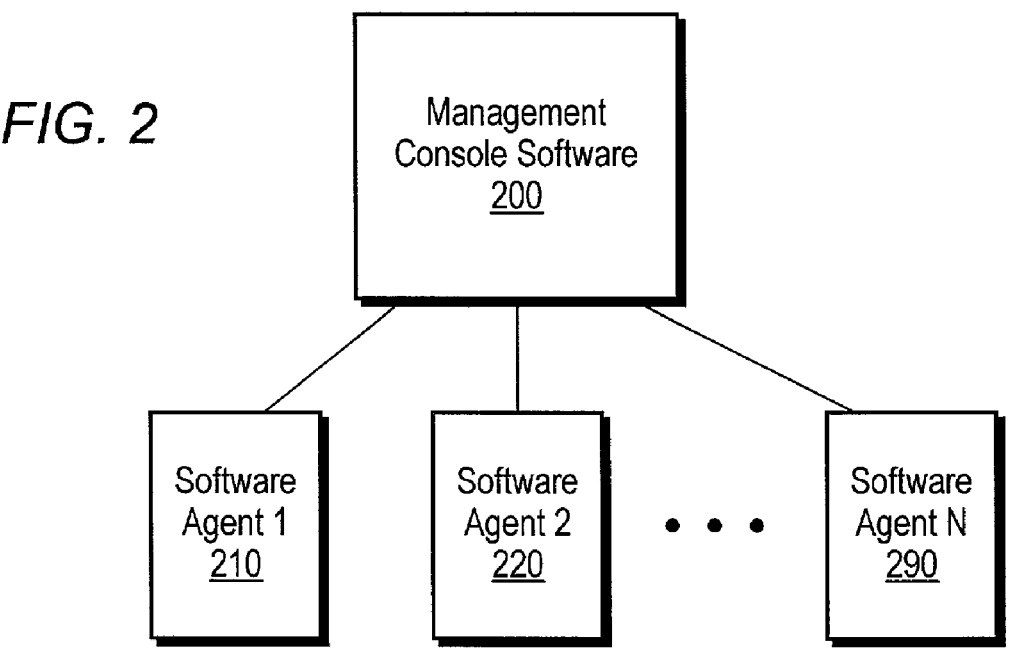
FIG. 2 illustrates management console software connected to a plurality of software agents according to one embodiment.

FIG. 2—Software Agents

FIG. 2 illustrates one embodiment of management console software connected to a plurality of software agents. In one embodiment, the management console software 200 may communicate with a plurality of software agents 210, 220, . . . , 290, as shown. Each of the plurality of software agents 210, 220, . . . , 290 may be executable on a respective server (e.g., servers 110, 120, . . . , 190, as shown in FIG. 1). Each of the plurality of software agents 210, 220, . . . , 290 may gather information about execution of the server. Additionally, each of the plurality of software agents 210, 220, . . . , 290 may gather information about the wireless services provided by the server. The gathered information may be provided to the management console (e.g., management console 100, as shown in FIG. 1).

In one embodiment, the management console 100 may be operable to display the gathered information regarding the plurality of servers and/or the gathered information regarding the wireless services provided by the plurality of servers, as the user desires. Additionally, the management console 100 may be operable to display the gathered information regarding individual servers of the plurality of servers and/or the gathered information regarding the wireless services provided by individual servers of the plurality of servers, as the user desires. Various other configurations of displaying the gathered information on the management console 100 may be chosen, as the user desires.

Figure 3:
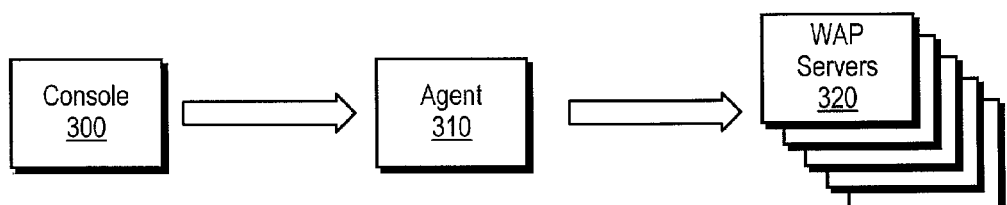
FIG. 3 illustrates an agent managing a plurality of wireless application protocol (WAP) servers according to one embodiment.

FIG. 3—Agent Managing a Plurality of Servers

FIG. 3 illustrates one embodiment of an agent managing a plurality of wireless application protocol (WAP) servers. In one embodiment, a console 300, also referred to as a management console (e.g., a PATROL console), may communicate with an agent 310 (e.g., a PATROL agent). The agent 310 may communicate with the plurality of WAP servers 320 (e.g., Nokia WAP Servers). The agent 310 may be referred to as the managing node. Alternatively, the agent 310 may reside on a computer system wherein the computer system on which the agent 310 resides is referred to as the managing node. The plurality of WAP servers 320 may be referred to as the managed nodes. Alternatively, the plurality of WAP servers 320 may reside on one or more computer systems wherein the one or more computer systems on which the plurality of WAP servers 320 reside are referred to as the managed nodes.

As used herein, the term "computer system" may be broadly defined to encompass any device having at least one processor that executes instructions from a memory medium. Examples of computer systems include, but are not limited to: a personal computer system, a mainframe computer system, a workstation, a network appliance, an Internet appliance, a personal digital assistant (PDA), a mobile phone, a cellular phone, a wireless phone, a pager, a wireless communications device, a television system, a communications device, or other device.

The computer system of both the managing node and the managed nodes may have a display device operable to display data. The display device may also be operable to display a graphical user interface. The graphical user interface may comprise any type of graphical user interface, e.g., depending on the computing platform.

The computer system of both the managing node and the managed nodes may include a memory medium(s) on which one or more computer programs or software components according to one embodiment of the present invention may be stored. The memory medium may also store operating system software, as well as other software for operation of the computer system.

The term "memory medium" is intended to include various types of memory or storage, including an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory or storage as well, or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution.

In one embodiment, the agent may implement a Knowledge Module (KM). The KM or agent may provide capabilities to monitor and/or manage the performance, operation, and/or availability of the WAP servers 320 from a centralized console (i.e., console 300).

The console 300 may provide the ability to manage one remote WAP Server at any one time. The console 300 may also provide the ability to manage multiple WAP Servers at any one time. The determination of the number (e.g., one or multiple) of WAP Servers being managed by the console 300 may be user configurable.

In one embodiment, only one agent may be required, on the managing node, to manage multiple WAP Servers without requiring any installation on the managed WAP Servers. A WAP Server may also be managed from the managing node, (i.e., installed on the same host as the agent). Computer system resource limitations may affect the number of WAP servers that may be managed with optimum performance (e.g., 5 WAP Servers to one agent).

WAP Servers are a software solution that reliably and cost-effectively connects WAP-enabled mobile terminals or mobile computer systems to content and applications hosted by World Wide Web (WWW) servers or any other server on the Internet or an Intranet. WAP Servers utilize telecom services called "bearers" to carry data through a wireless network.

In one embodiment, the console 300 may graphically display numerous details regarding the state of the servers, either information specific to an individual server or collective information regarding a plurality of the servers. Examples of various particular details that may be graphically displayed follow.

The console 300 may display a graphical depiction of the managed WAP Servers 320 for the managing node (i.e., agent 310). The console 300 may also graphically display defined component objects, server attributes and/or statistics, and/or configuration parameter settings related to the WAP Servers 320. The console 300 may also display a graphical depiction of defined terminals, users, and/or groups and their respective attributes. The console 300 may also graphically display bearers and their respective attributes.

User-initiated action commands may be issued against the WAP servers to manipulate or change configuration settings. Various server logs may be managed to permit configuration and query functions, as the user desires. WAP Server alarms may be published through an event manager. A server monitor may be used to gather statistics other than those kept by the server (e.g., transaction totals, throughput, response times at either the bearer level and/or the server level).

Figure 4:
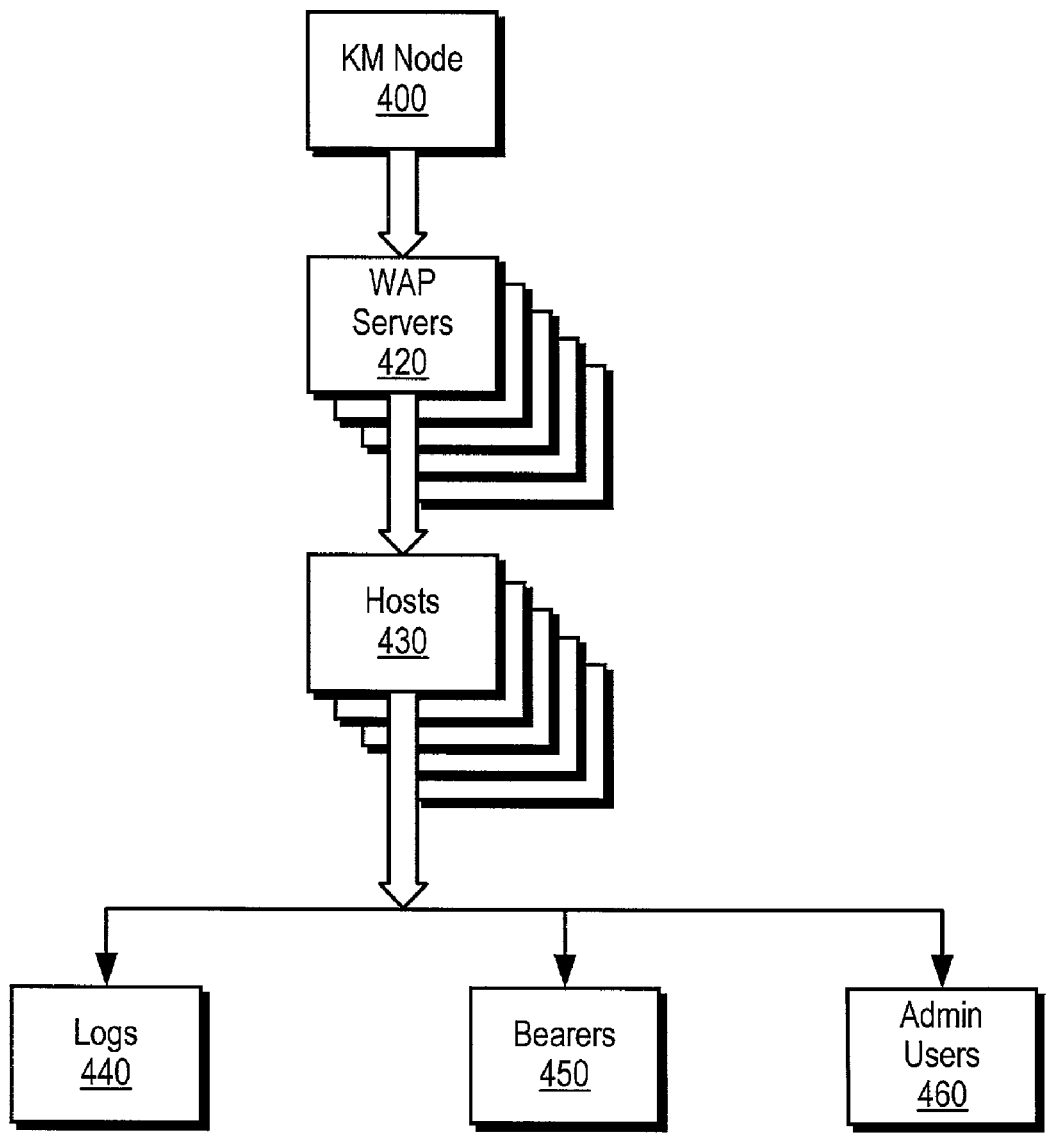
FIG. 4 illustrates topology/instances displayed on the management console according to one embodiment.

FIG. 4—Management Console

FIG. 4 illustrates one embodiment of topology/instances displayed on the management console.

In one embodiment, the topology/instances shown in FIG. 4 may be displayed on the management console as a result of loading a WAP Server KM node 400 (e.g., the Nokia WAP Server KM) on the managing node.

The KM node 400 communicates with the WAP Servers 420. The WAP Servers 420, in turn, communicate with the Hosts 430 (e.g., Nokia WAP Server Hosts). Each Host 430 may have a series of associated logs 440 (e.g., an access log, an admin log, an error log, a servlet log, a bearer log, among others), information related to a series of bearer adapters 450 (e.g., bearer instances and their attributes), and information related to admin users 460 (e.g., User Ids, passwords, attributes).

The KM node 400 may implement a Response Time Monitor whose data collector scripts may gather statistical information for the WAP Servers 420 and bearers from the respective WAP Server Access log files. Examples of gathered statistical information may include, but are not limited to: transaction totals, transaction rates and average transaction response times.

In one embodiment, the data collector may be developed using PSL script and a Nokia WAP Server Command Prompt (wapadmin) "view log" function to read the Nokia Wap Server Access log. The transaction number, bearer name, request size, response size and response time may be extracted from the Access log records to calculate the new parameters values. The data collector may collect data at a user-configurable interval (e.g. every 5 minutes). Enabling and disabling the data collector feature may be user configurable.

FIGS. 5 through 30—Series of Example Screenshots

FIGS. 5 through 30 are embodiments of a series of screenshots of various windows of the PATROL for Nokia WAP Server application, a product of BMC Software, Inc., illustrating various embodiments of the present invention.

Figure 5:
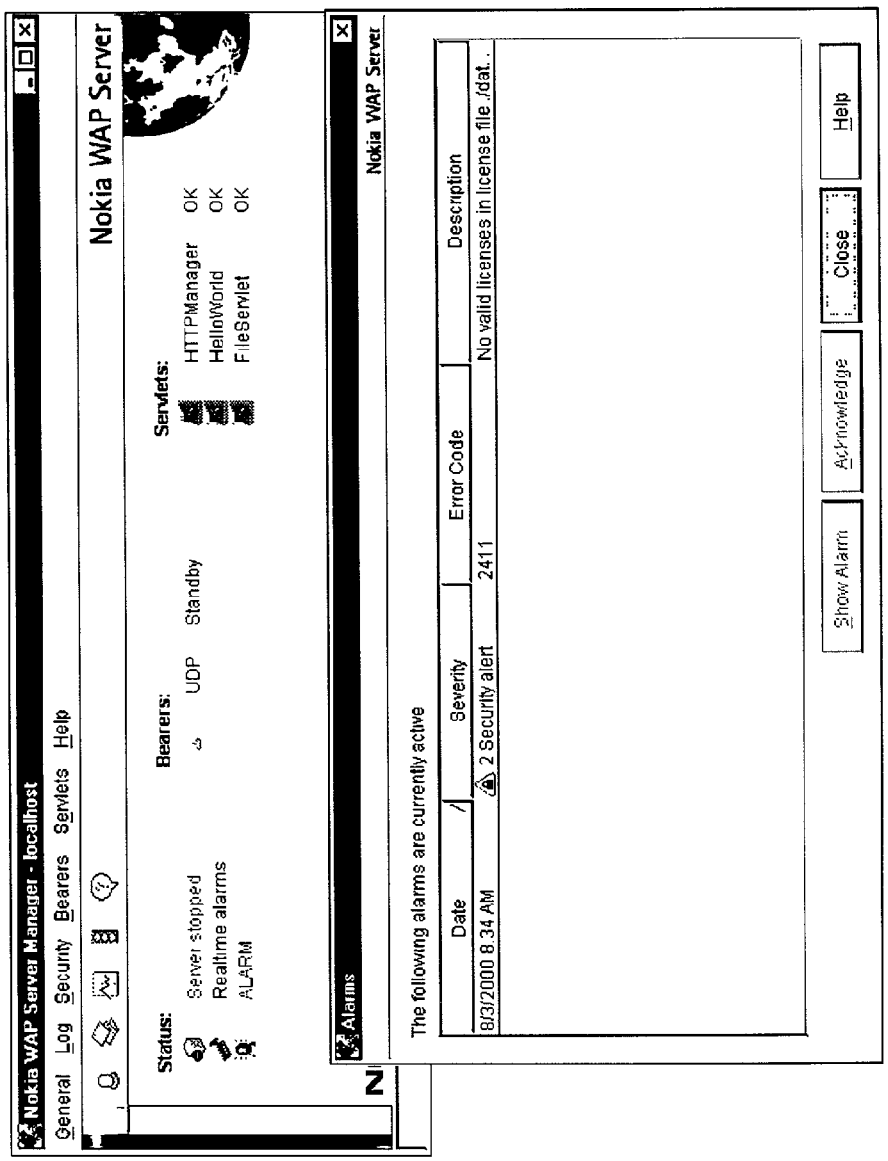
FIG. 5 is a screenshot of an active event log showing an alarm according to one embodiment.

FIG. 5 is one embodiment of a screenshot of an active event log showing an alarm. The Nokia WAP Server "show alarms" admin command may respond with one line of output per alarm.

Figure 6:
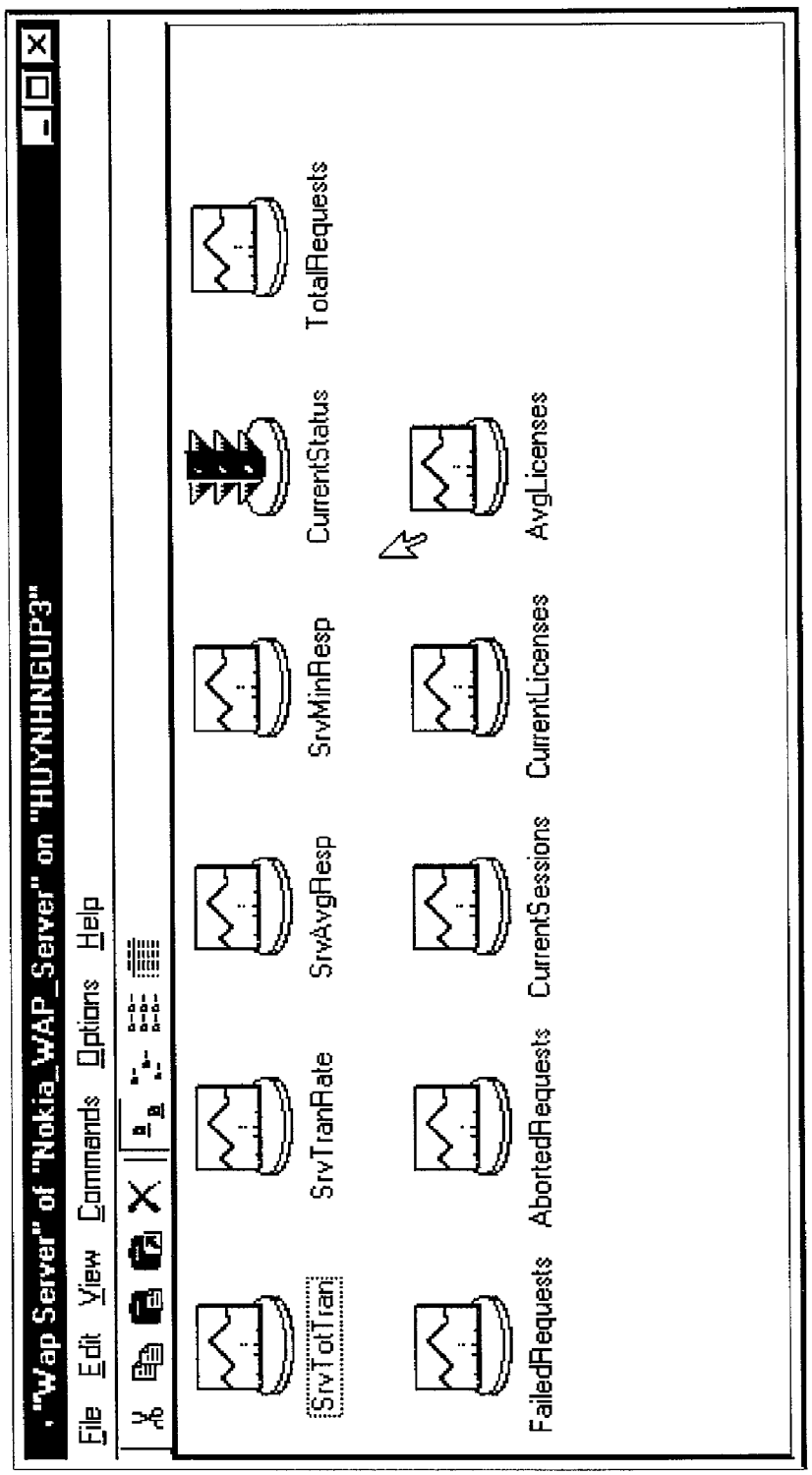
FIG. 6 is a screenshot of various response time related parameters according to one embodiment.

FIG. 6 is one embodiment of a screenshot of various response time related parameters. The parameters shown include: SrvTotTran (Server Total Transactions), SrvTranRate (Server Transaction Rate), SrvAvgResp (Server Average Response Time), SrvMinResp (Server Minimum Response Time), CurrentStatus, TotalRequests, FailedRequests, AbortedRequests, CurrentSessions, CurrentLicenses, and AvgLicenses (Average number of Licenses). In other embodiments, the response time related parameters may include additional parameters not shown in FIG. 6 and/or some of the response time related parameters shown in FIG. 6 may be omitted, as desired.

Figure 7:
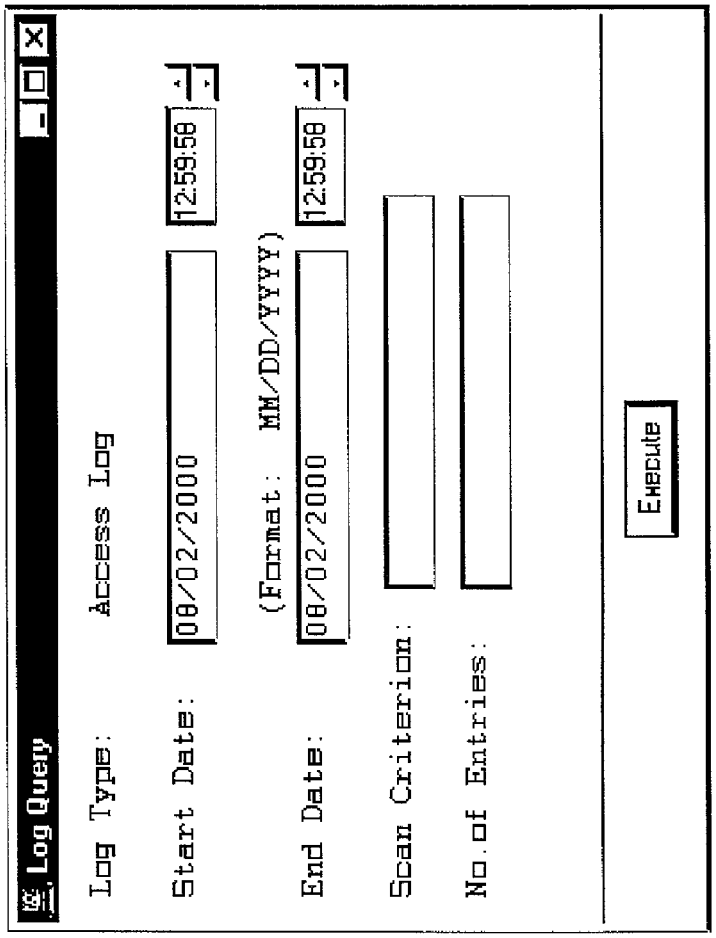
FIG. 7 is a screenshot of a log query dialog for an access log according to one embodiment.

FIG. 7 is one embodiment of a screenshot of a log query dialog for an access log. As used herein, an access log is used to log or store information related to a Wireless Session Protocol (WSP) transaction. A WSP transaction is basically a request-response pair. In a connection mode protocol, a WSP transaction may be referred to as request-response-acknowledgement.

Figure 8:
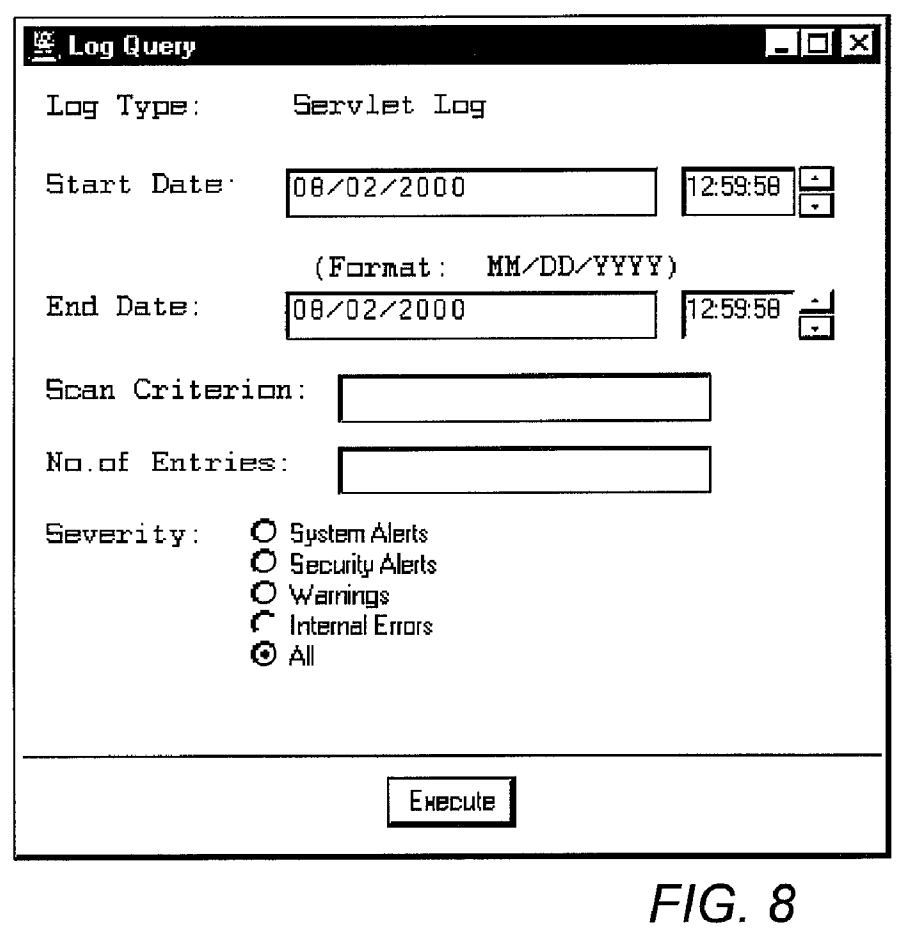

FIG. 8 is one embodiment of a screenshot of a log query dialog for a servlet log. As used herein, a servlet log is used to log or store information related to servlet error entries. Other types of logs, each of which may have a log query dialog similar to the screenshot shown in FIG. 8, include: an admin log, a bearer log, an error log. It is noted that additional logs may exist or may be used, based on the user settings. Also, each of the previously mentioned logs may be enabled or disabled via user settings. As used herein, an admin log is used to log or store information related to admin command entries issued against the WAP Server. As used herein, a bearer log is used to log or store information related to bearer adapters errors. As used herein, an error log is used to log or store information related to different levels of severity.

Figure 9:
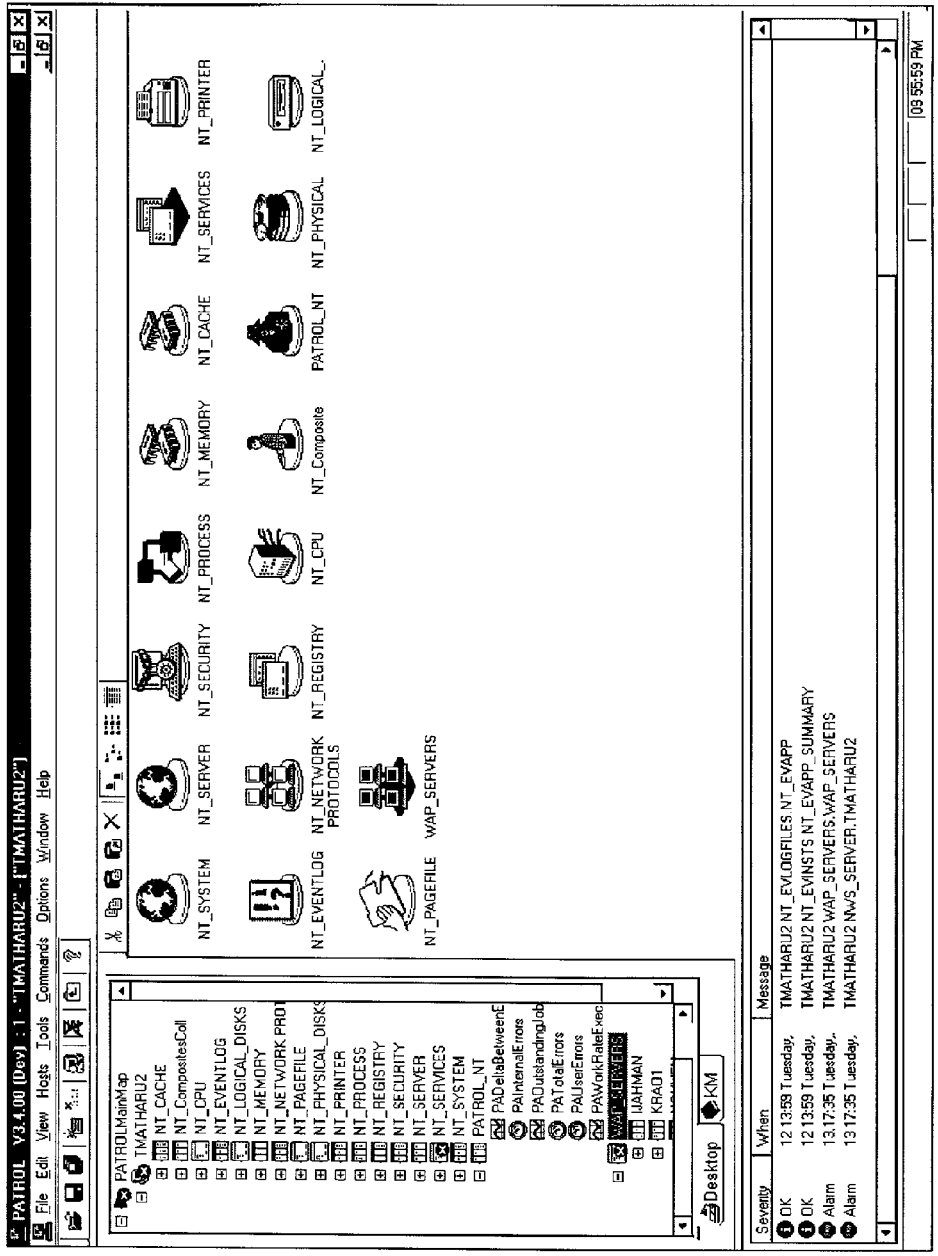
FIG. 9 is a screenshot of various objects as represented on a management console according to one embodiment.

FIG. 9 is one embodiment of a screenshot of various objects as represented on a management console. The management console shown is the PATROL management console. It is noted that the objects or icons displayed on the right side of the PATROL management console of FIG. 9 correspond to the listing on the left side of the PATROL management console. These objects include: NT_SYSTEM, NT_SERVER, NT_SECURITY, NT_PROCESS, NT_MEMORY, NT_CACHE, NT_SERVICES, NT_PRINTER, NT_EVENTLOG, NT_NETWORK PROTOCOLS, NT_REGISTRY, NT_CPU, NT_CompositesColl, PATROL_NT, NT_PHYSICAL_DISKS, NT_LOGICAL_DISKS, NT_PAGEFILE, and WAP_SERVERS. The WAP_SERVERS entry in the listing is highlighted. When the user selects the WAP_SERVERS entry in the listing, the user is presented with the screenshot shown in FIG. 10.

Figure 10:
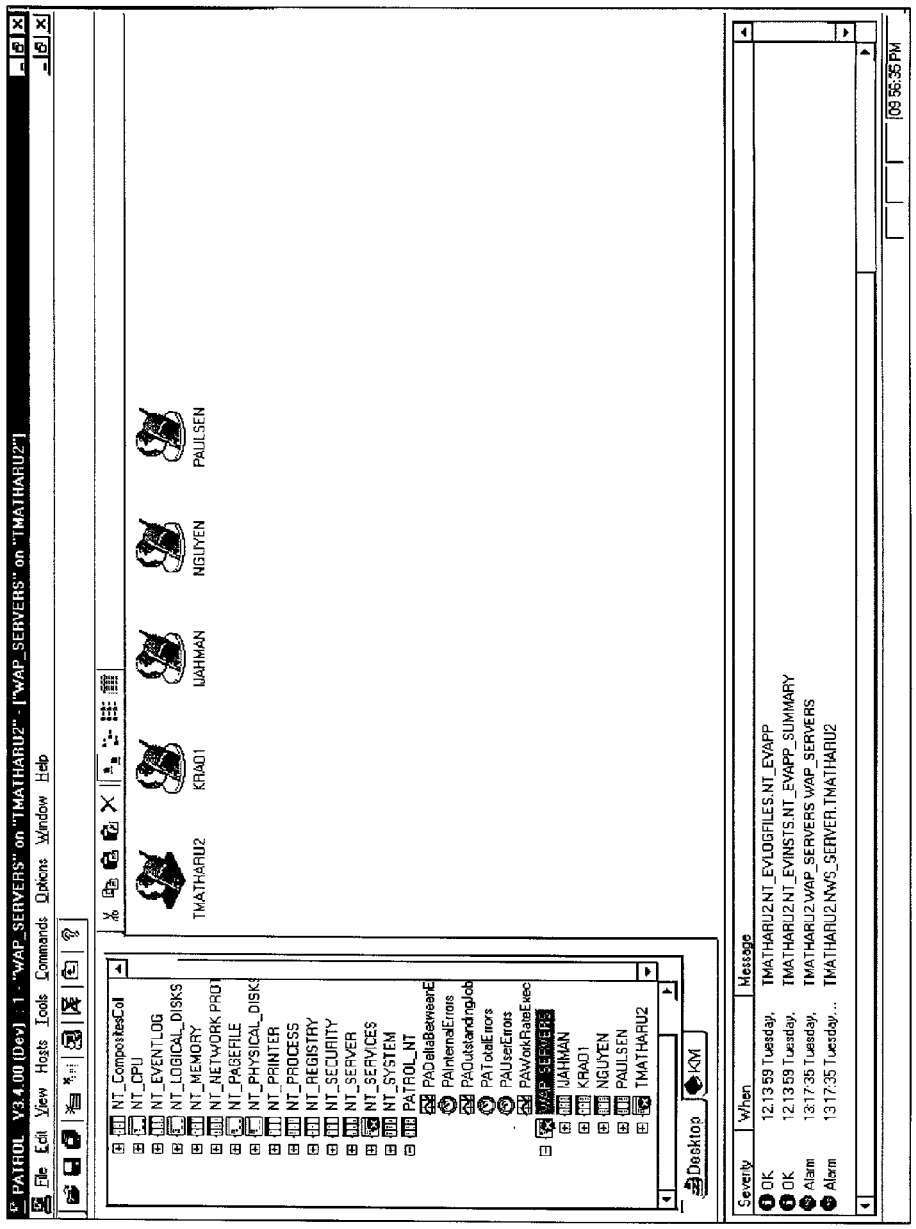
FIG. 10 is a screenshot of WAP servers as represented on a management console according to one embodiment.

FIG. 10 is one embodiment of a screenshot of WAP servers as represented on a management console. As noted in FIG. 9, the objects or icons displayed on the right side of the PATROL management console of FIG. 10 correspond to the listing on the left side of the PATROL management console. These objects include: five named WAP servers: TMATHARU2, KRAO1, IJAUMAN, NGUYEN, and PAULSEN.

Preceding each of the entries in the listing on the left side of the PATROL management console in both FIGS. 9 and 10 is an indicator. This indicator is typically a conventional plus ("+") sign which indicates further elements are available in a hierarchy tree of elements. In FIG. 10 the indicator shown is the expansion indicator, that is a conventional minus ("−") sign, for two of the entries: PATROL_NT and WAP_SERVERS. Typically the indicator toggles between the expanded state (i.e., the minus sign) and the collapsed state (i.e., the plus sign) when a user selects the indicator. The minus sign indicates that the PATROL_NT and WAP_SERVERS entries are expanded; conversely, for the remaining entries, the indicator is the conventional plus ("+") sign, indicating that the remaining entries are collapsed.

Figure 11:
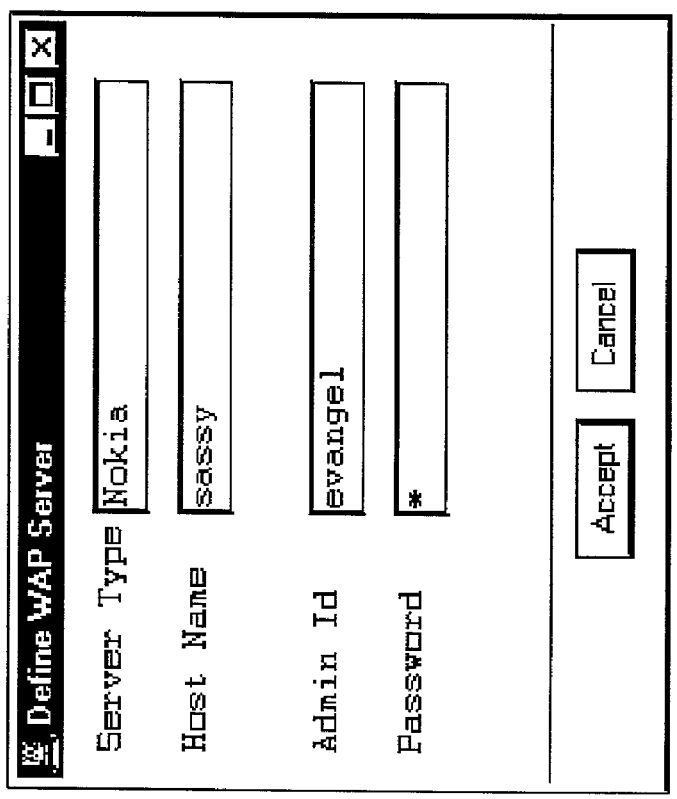
FIG. 11 is a screenshot of defining a WAP server according to one embodiment.

FIG. 11 is one embodiment of a screenshot of defining a WAP server. The four entry fields (i.e., Server Type, Host Name, Admin Id, and Password) shown in FIG. 11 had previously been filled out for the five named WAP servers shown in FIG. 10. The * shown in the entry field for Password indicates that the entry is encrypted. If the user selects the Accept PushButton after filling in the four entry fields, a new named WAP server is created. After creation, the new named WAP server would appear in the listing on the left side of the PATROL management console, when the WAP_SERVERS entry is expanded.

Figure 12:
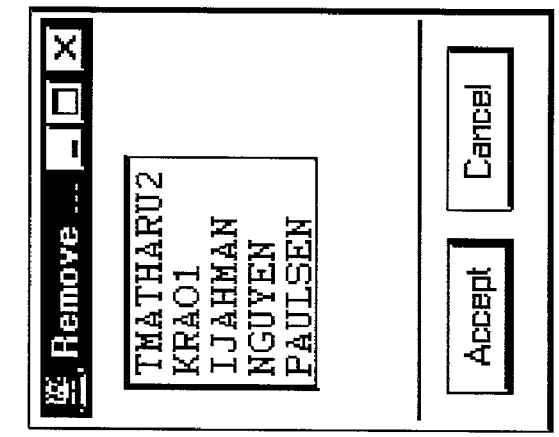
FIG. 12 is a screenshot of removing a WAP server according to one embodiment.

FIG. 12 is one embodiment of a screenshot of removing a WAP server. Each named WAP server from the listing on the left side of the PATROL management console of FIG. 10 appears in the selection list for removal in FIG. 12. If the user selects the Accept PushButton after choosing one or more named WAP servers from the selection list for removal, the selected WAP server(s) are deleted. After deletion, the selected WAP server(s) would no longer appear in the listing on the left side of the PATROL management console, when the WAP_SERVERS entry is expanded.

Figure 13:
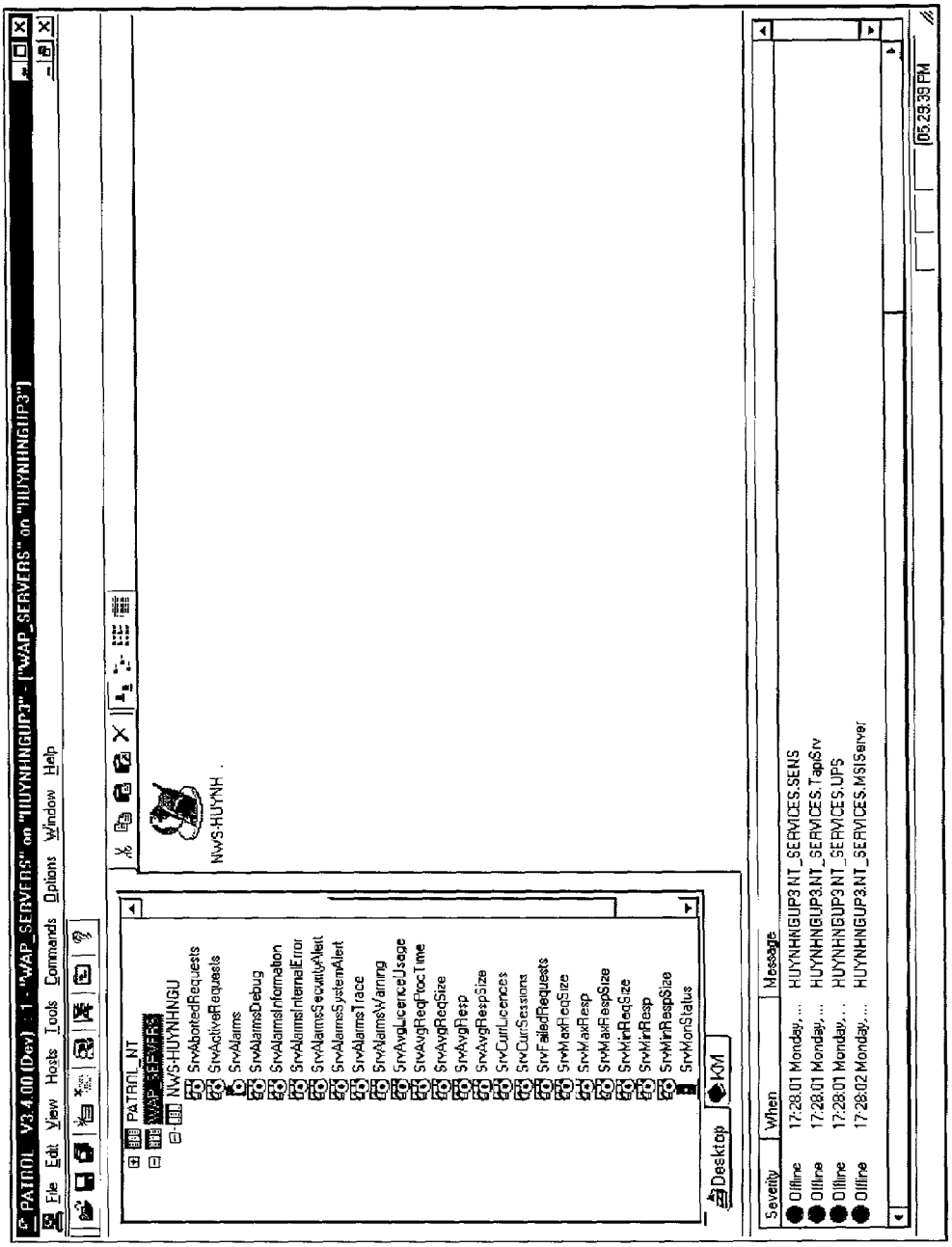
FIG. 13 is a screenshot of an expanded list of parameters for a given WAP server according to one embodiment.

FIG. 13 is one embodiment of a screenshot of an expanded list of parameters for a given WAP server. It is noted that the named WAP server (i.e., NWS-HUYNHNGU) shown in FIG. 13 differs from the list of five named WAP servers in FIG. 10. The reason for this difference is that the computer system upon which the instance of PATROL is running is different (i.e., for FIG. 10 the computer system is named "TMATHARU2", for FIG. 13 the computer system is named "HUYNHNGUP3"), as illustrated in the title line of the screenshot in both figures. The expanded list of parameters for the NWS-HUYNHNGU WAP server include: SrvAbortedRequests, SrvActiveRequests, SrvAlarms, SrvAlarmsDebug, SrvAlarmsInformation, SrvAlarmsInternalError, SrvAlarmsSecurityAlert, SrvAlarmsSystemAlert, SrvAlarmsTrace, SrvAlarmsWarning, SrvAvgLicenceUsage, SrvAvgReqProcTime, SrvAvgReqSize, SrvAvgResp, SrvAvgRespSize, SrvCurrLicences, SrvCurrSessions, SrvFailedRequests, SrvMaxReqSize, SrvMaxResp, SrvMaxRespSize, SrvMinReqSize, SrvMinResp, SrvMinRespSize, SrvMonStatus, as well as several more parameters not shown in the screenshot (as indicated by the scroll bar position).

Figure 14:
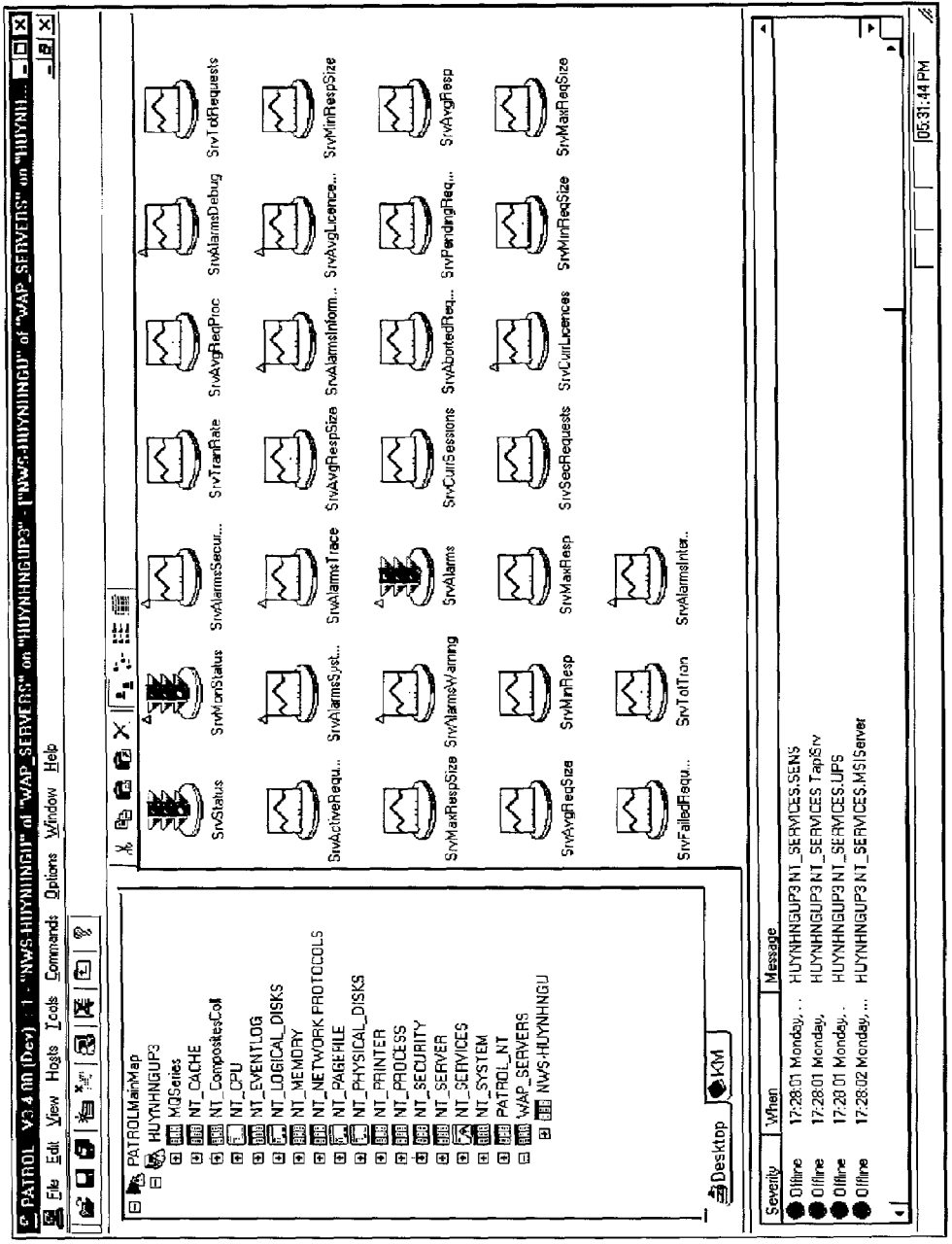
FIG. 14 is a screenshot of icons related to the expanded list of parameters for the given WAP server of FIG. 13 according to one embodiment.

FIG. 14 is one embodiment of a screenshot of icons related to the expanded list of parameters for the given WAP server of FIG. 13. In addition to icons for the expanded list of parameters for the NWS-HUYNHNGU WAP server enumerated for FIG. 13, the icons shown in FIG. 14 also include icons for the following parameters: SrvStatus, SrvTranRate, SrvTotRequests, SrvPendingRequests, SrvSecRequests, and SrvTotTran. It is noted that the listing on the left side of the PATROL management console screenshot of FIG. 14 should show the NWS-HUYNHGU WAP server in the expanded state (i.e., the minus sign) rather than the collapsed state (i.e., the plus sign).

Figure 15:
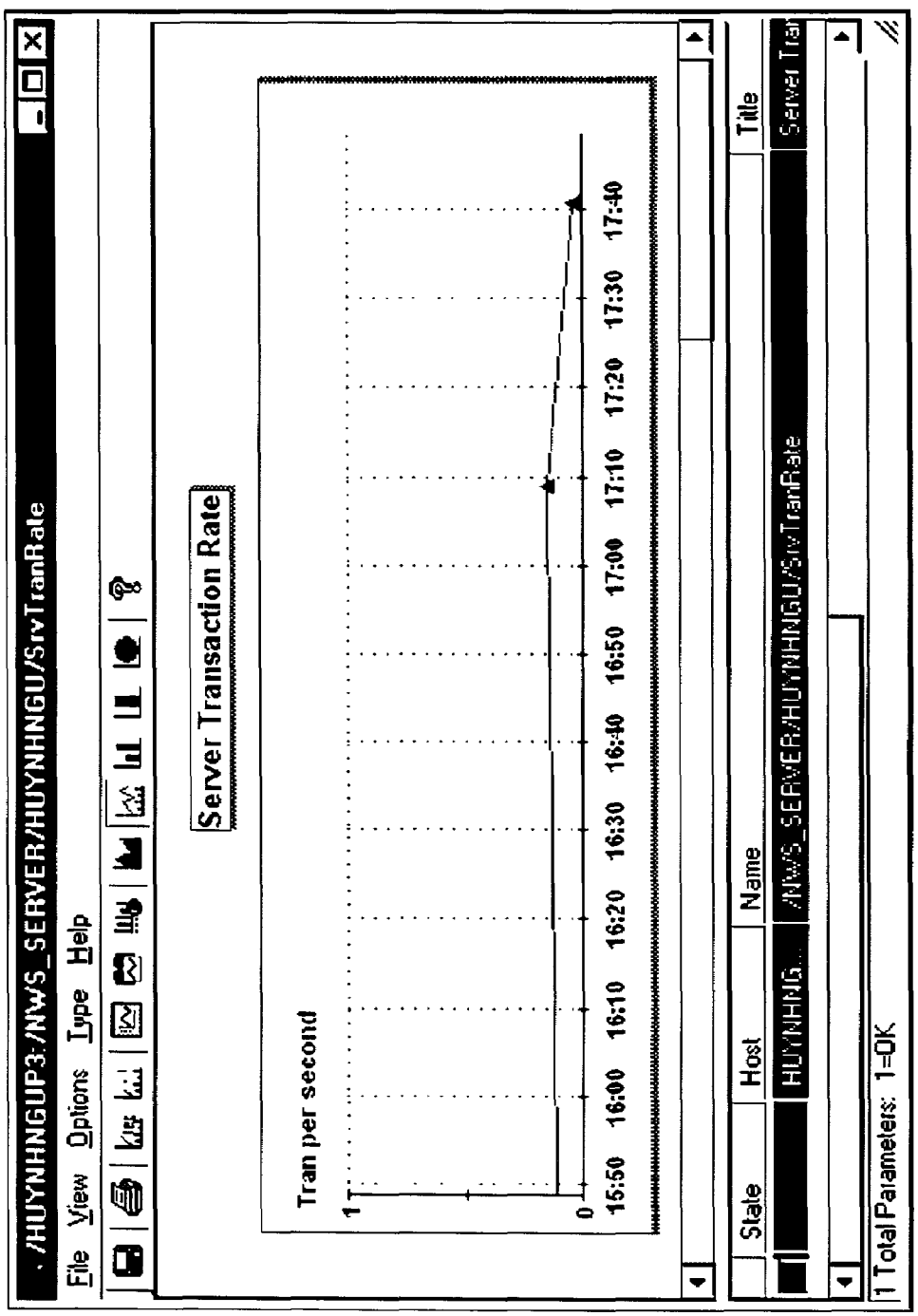
FIG. 15 is a screenshot of a graphical representation of the Server Transaction Rate parameter for the given WAP server of FIG. 13 according to one embodiment.
Figure 16:
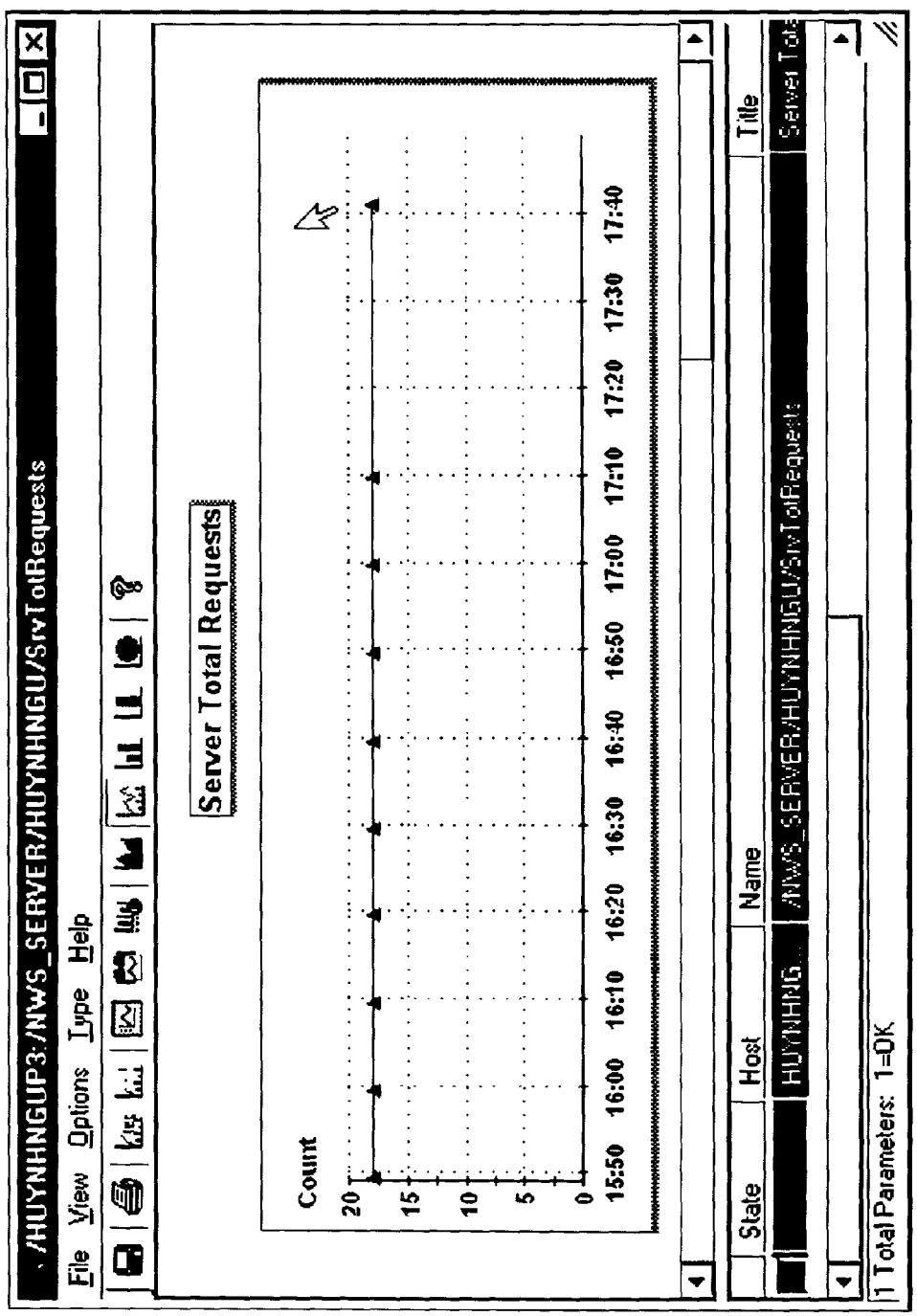
FIG. 16 is a screenshot of a graphical representation of the Server Total Requests parameter for the given WAP server of FIG. 13 according to one embodiment.

FIG. 15 is one embodiment of a screenshot of a graphical representation of the Server Transaction Rate parameter for the given WAP server of FIG. 13. Similarly, FIG. 16 is one embodiment of a screenshot of a graphical representation of the Server Total Requests parameter for the given WAP server of FIG. 13.

Figure 17:
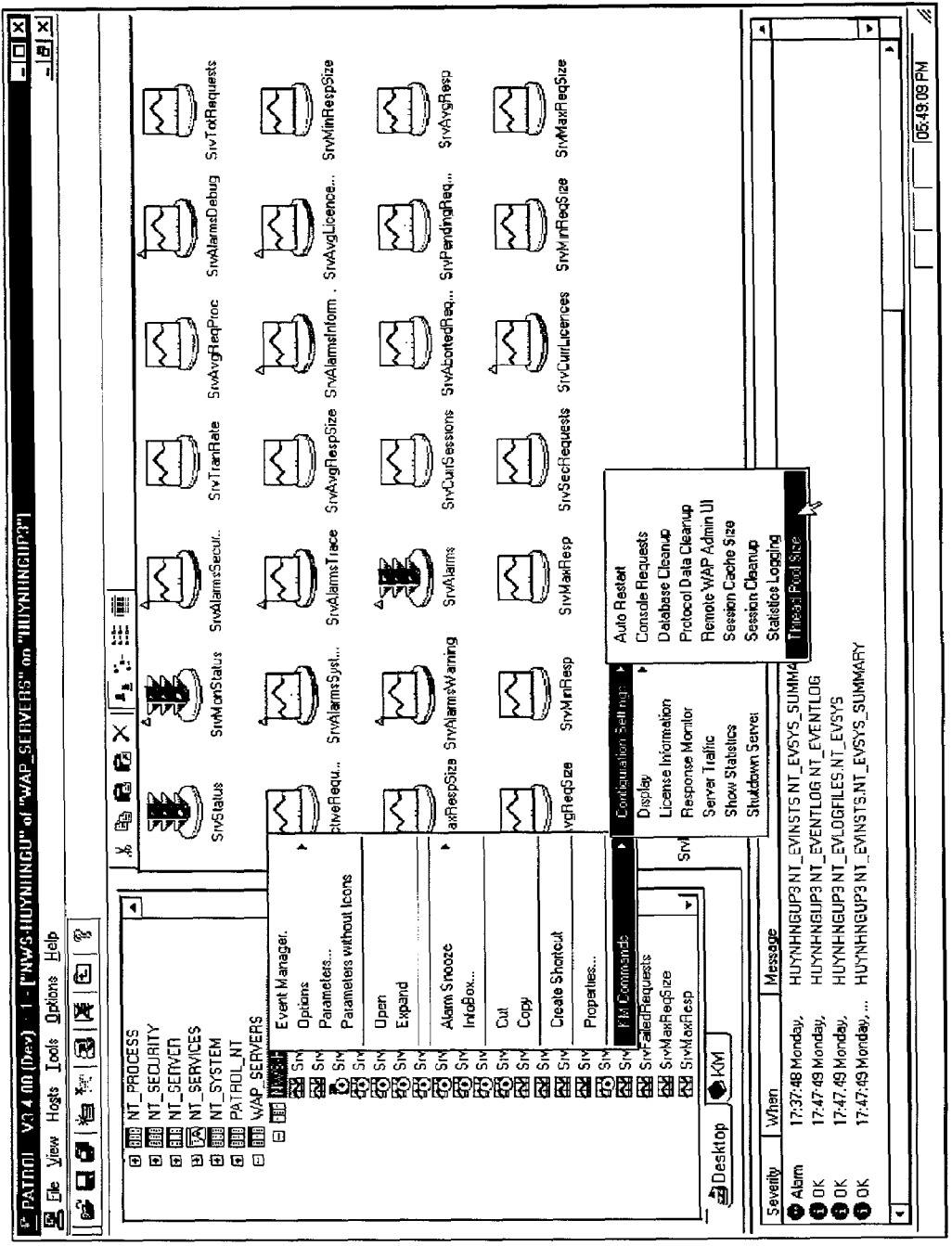
FIG. 17 is a screenshot of a thread pool size menu command according to one embodiment.

FIG. 17 is one embodiment of a screenshot of a thread pool size menu command. As shown, cascading drop-down lists lead from the menu choice "KM Commands", to "Configuration Settings", to "Thread Pool Size". In one embodiment, this series of menus is displayed when the user right-clicks a pointing device (e.g., a mouse) on the named WAP Server (i.e., NWS-UYNGU) in the listing on the left side of the PATROL management console in FIG. 17.

Figure 18A:
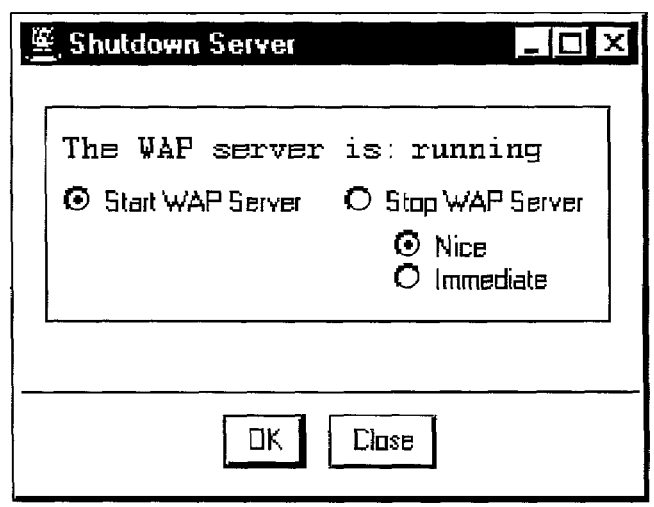
FIG. 18A is a screenshot of a dialog to start or stop a WAP server according to one embodiment.
Figure 18B:
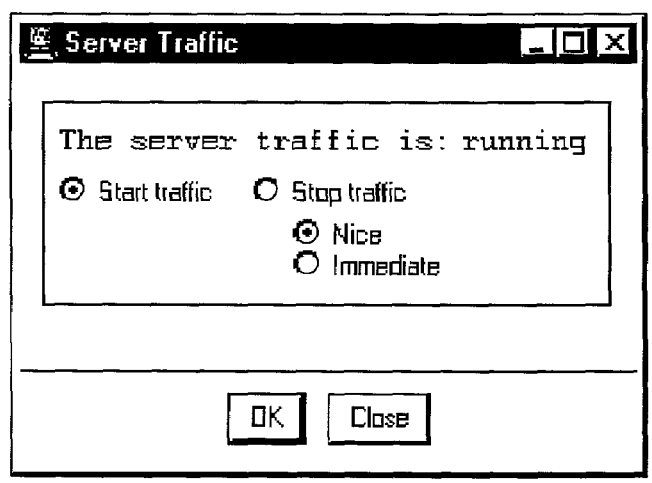
FIG. 18B is a screenshot of a dialog to start or stop server traffic according to one embodiment.
Figure 18C:
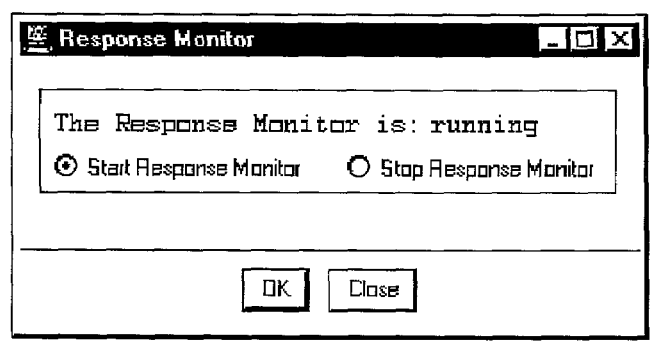
FIG. 18C is a screenshot of a dialog to start or stop a response monitor according to one embodiment.

FIGS. 18A, 18B, and 18C are embodiments of screenshots of dialogs to start or stop a WAP server, server traffic, and a response monitor, respectively. In each dialog, radio buttons allow the user to choose either a start action or a stop action. Further, for FIGS. 18A and 18B, if either the start action or the stop action is chosen, the user may choose "nice" or "immediate", as shown, the default is "nice".

Figure 19:
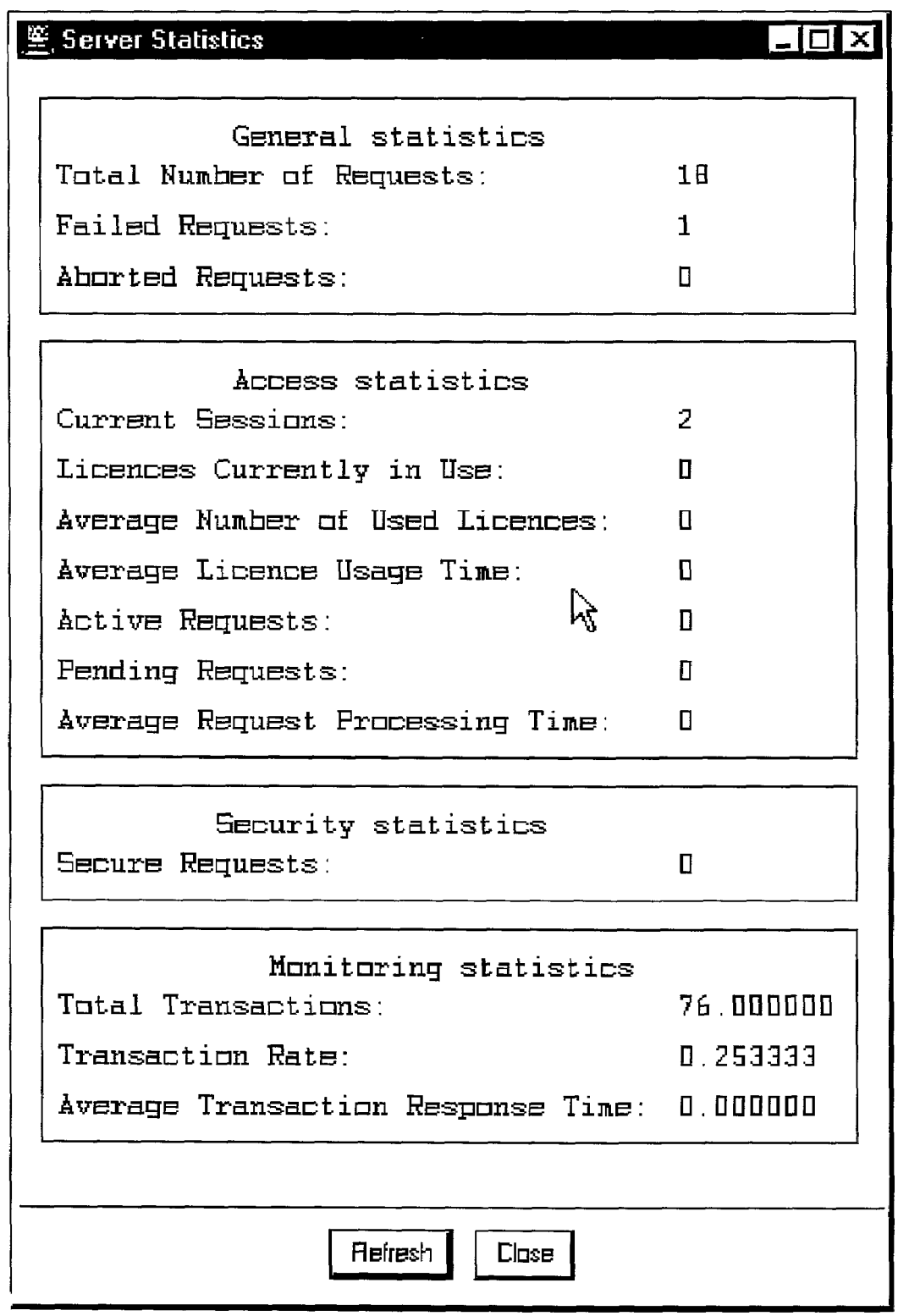
FIG. 19 is a screenshot of server statistics according to one embodiment.

FIG. 19 is one embodiment of a screenshot of server statistics. The four types of server statistics shown in FIG. 19 include: general statistics, access statistics, security statistics, and monitoring statistics. The user may leave this window displayed and periodically choose the Refresh PushButton to update the values of the statistics.

Figure 20:
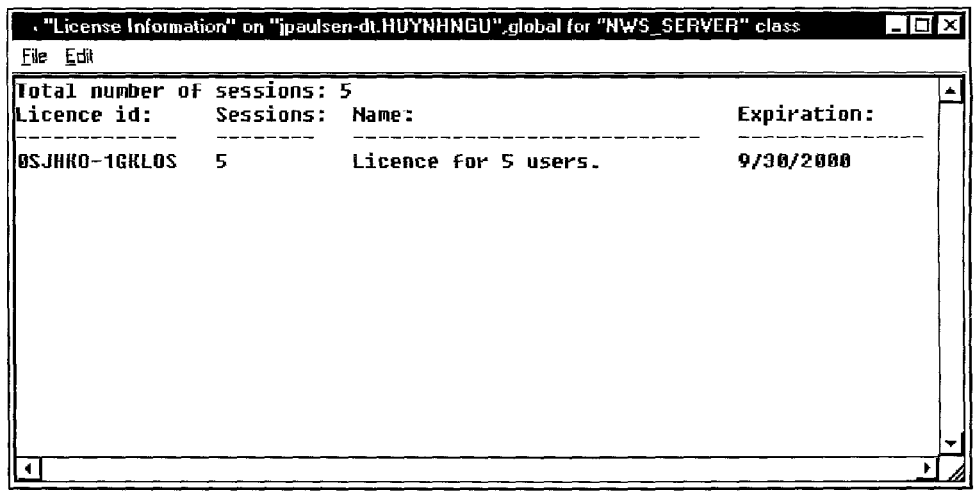
FIG. 20 is a screenshot of license information according to one embodiment.
Figure 21:
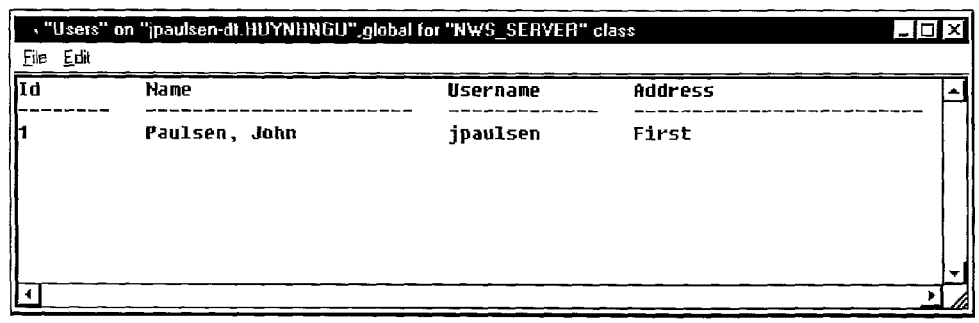
FIG. 21 is a screenshot of user information according to one embodiment.
Figures 22A, 22B:
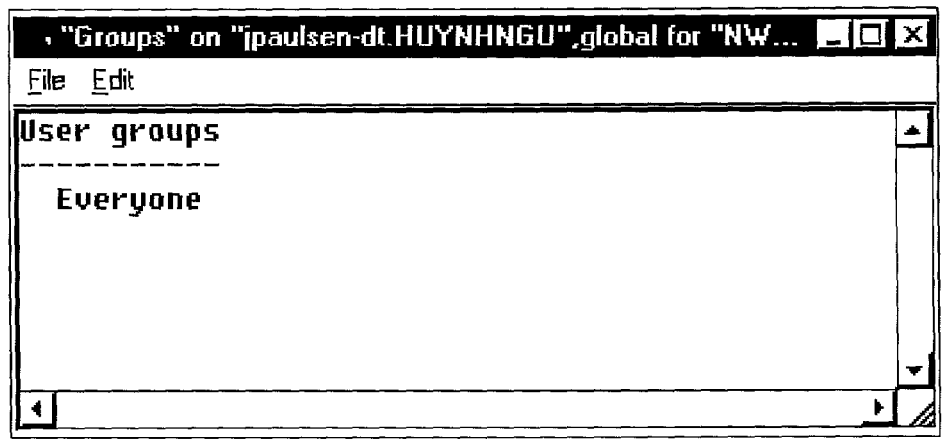
FIG. 22A is a screenshot of group information according to one embodiment.
FIG. 22B is a screenshot of terminal information according to one embodiment.

FIG. 20 is one embodiment of a screenshot of license information. FIG. 21 is one embodiment of a screenshot of user information. FIG. 22A is one embodiment of a screenshot of group information. FIG. 22B is one embodiment of a screenshot of terminal information. Each of FIGS. 20, 21, 22A, and 22B includes a listing of details regarding license information, user information, group information, and terminal information, respectively.

Figure 23:
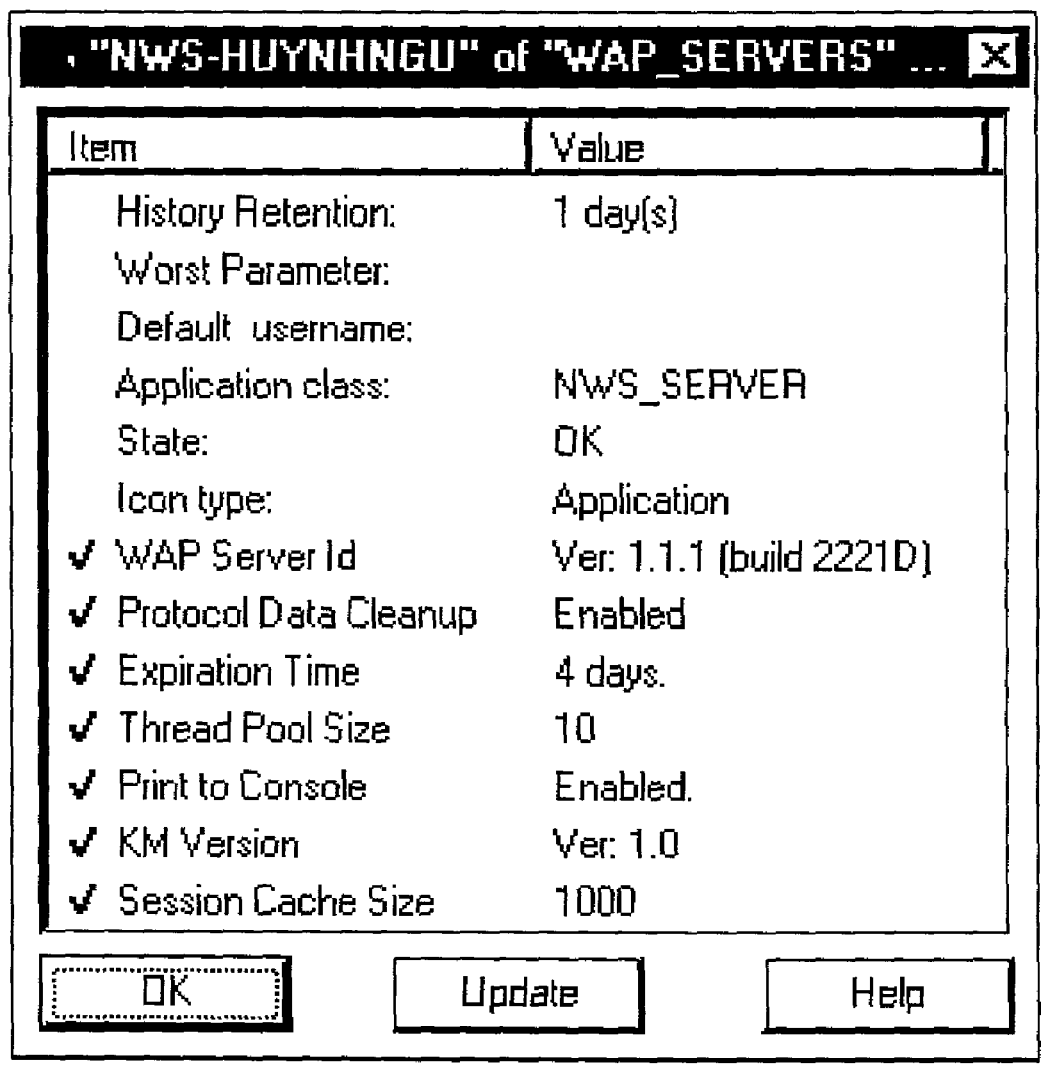
FIG. 23 is a screenshot listing various parameters for the given WAP server of FIG. 13 according to one embodiment.

FIG. 23 is one embodiment of a screenshot listing various parameters for the given WAP server of FIG. 13. The following items are shown in FIG. 23, along with their values: History Retention: 1 day(s); Worst Parameter: undefined; Default username: undefined; Application class: NWS_SERVER; State: OK; Icon Type: Application. Additionally, the following items (preceded by a check mark) are shown in FIG. 23, along with their values: WAP Server Id: Ver. 1.1.1 (build 2221D); Protocol Data Cleanup: Enabled; Expiration Time: 4 days; Thread Pool Size: 10; Print to Console: Enabled; KM Version: Ver. 1.0; Session Cache Size: 1000.

Figure 24:
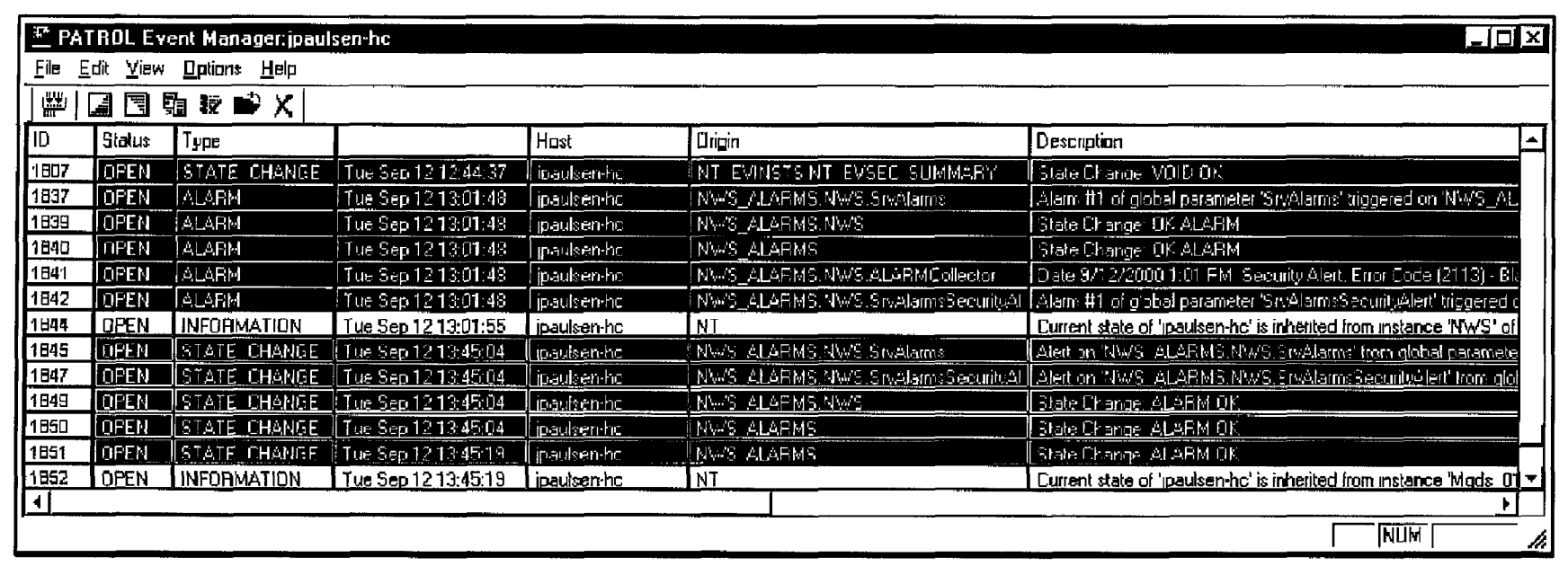

FIG. 24 is one embodiment of a screenshot of an event manager log. As shown, there are 13 entries displayed on the window, however, as the position of the scroll bar indicates, additional entries appear both above (i.e., earlier in time) and below (i.e., later in time) these 13 entries. Of the 13 entries visible in FIG. 24, 6 are of type STATE CHANGE, 5 are of type ALARM, and 2 are of type INFORMATION. The two INFORMATION entries are shown highlighted.

Figure 25:
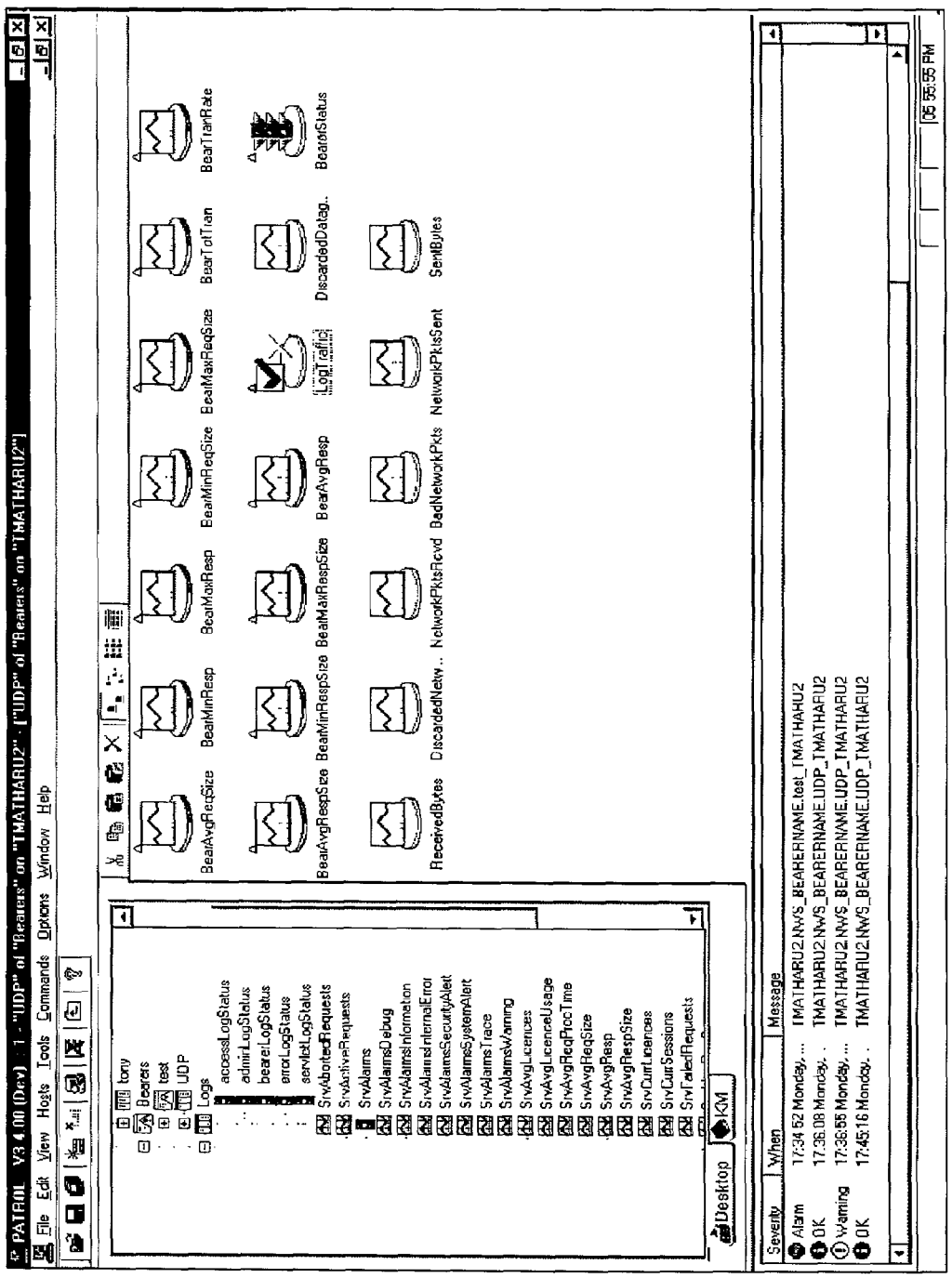
FIG. 25 is a screenshot of icons representing bearer parameters according to one embodiment.

FIG. 25 is one embodiment of a screenshot of icons representing bearer parameters. The parameters shown include: BearAvgReqSize, BearMinResp, BearMaxResp, BearMinReqSize, BearMaxReqSize, BearTotTran, BearTranRate, BearAvgRespSize, BearMinRespSize, BearMaxRespSize, BearAvgResp, LogTraffic, DiscardedData, BearerStatus, ReceivedBytes, DiscardedNetwork, NetworkPktsRcvd, BadNetworkPkts, NetworkPktsSent, and SentBytes. In other embodiments, the bearer parameters may include additional parameters not shown in FIG. 25 and/or some of the bearer parameters shown in FIG. 25 may be omitted, as desired.

Figure 26:
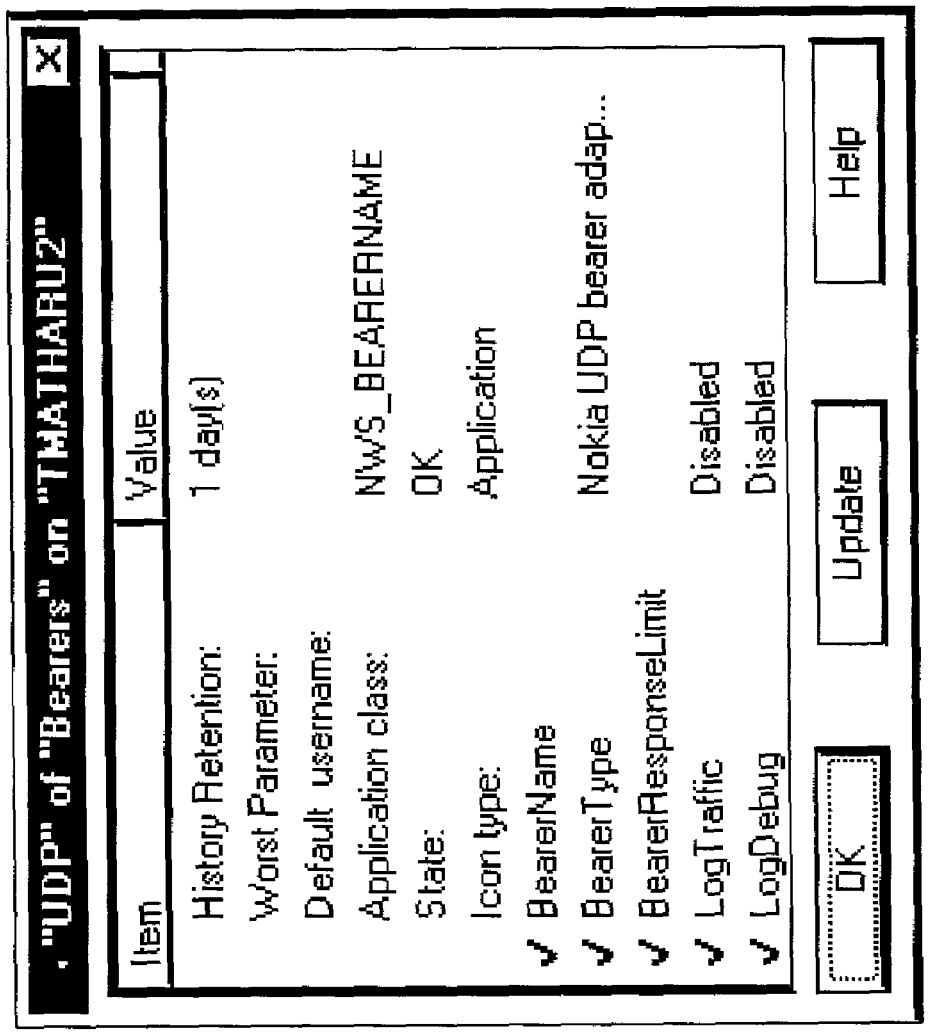
FIG. 26 is a screenshot listing various bearer parameters for a given WAP server according to one embodiment.

FIG. 26 is one embodiment of a screenshot listing various bearer parameters for a given WAP server. The following items are shown in FIG. 26, along with their values: History Retention: 1 day(s); Worst Parameter: undefined; Default username: undefined; Application class: NWS_BEARERNAME; State: OK; Icon Type: Application. Additionally, the following items (preceded by a check mark) are shown in FIG. 26, along with their values: BearerName: undefined; BearerType: Nokia UDP bearer adapter; BearerResponseLimit: undefined; LogTraffic: Disabled; LogDebug: Disabled.

Figure 27:
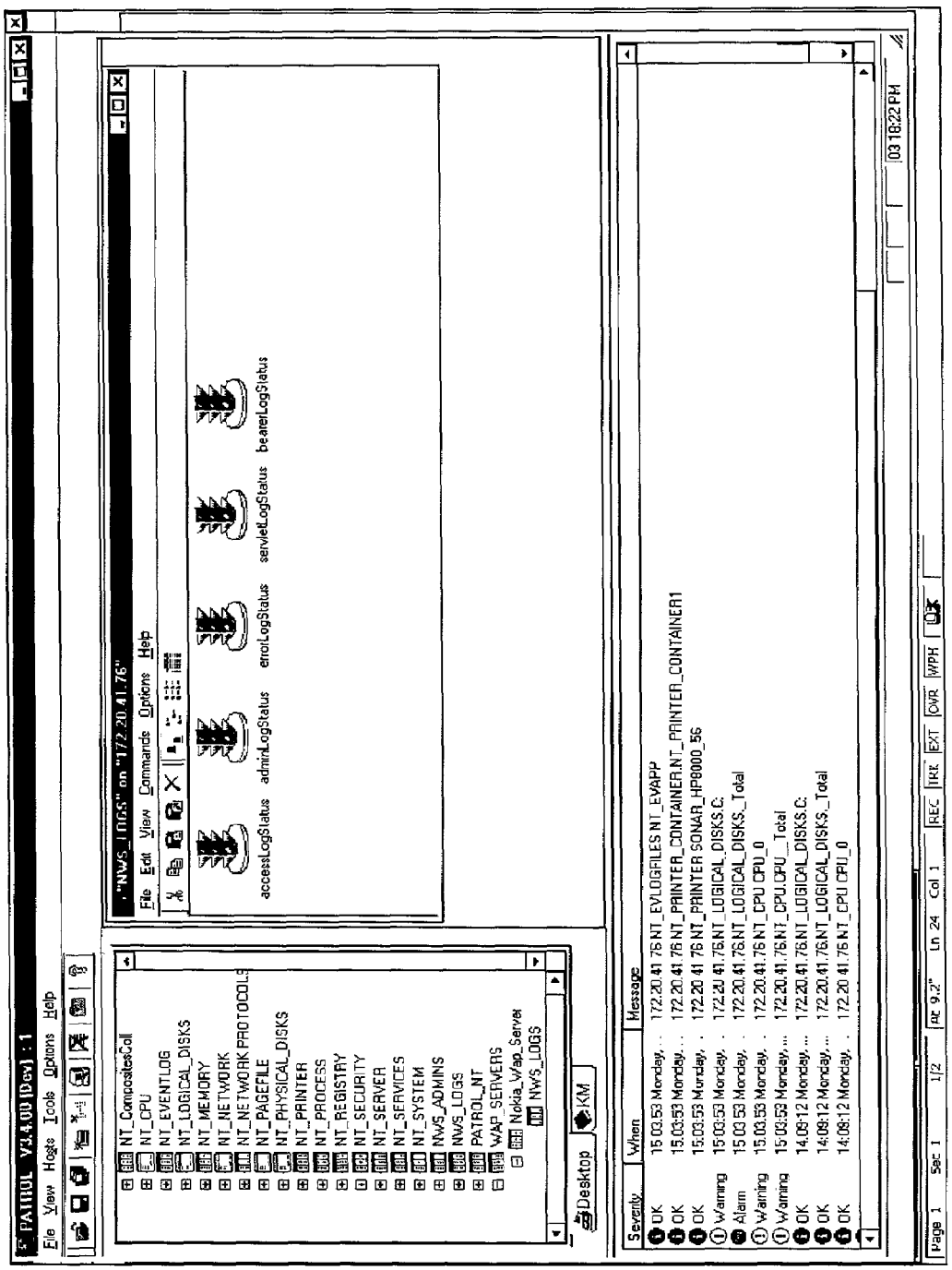
FIG. 27 is a screenshot of icons representing log status parameters according to one embodiment.

FIG. 27 is one embodiment of a screenshot of icons representing log status parameters. As shown, the five log status parameters include: accessLogStatus, adminLogStatus, errorLogStatus, servletLogStatus, and bearerLogStatus. In other embodiments, the log status parameters may include additional parameters, representing additional logs, not shown in FIG. 27 and/or some of the logs and corresponding log status parameters shown in FIG. 27 may be omitted, as desired.

Figure 28:
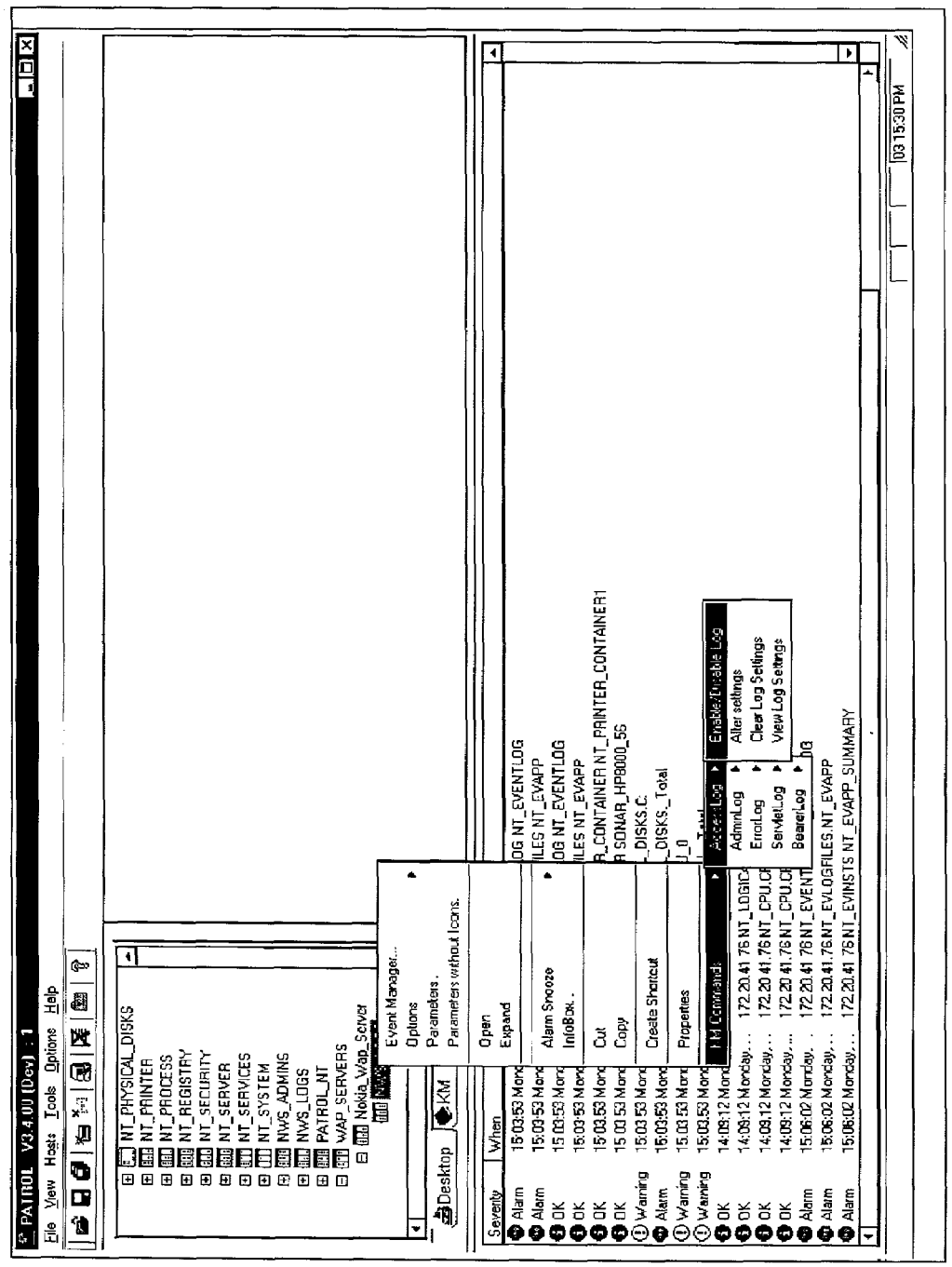
FIG. 28 is a screenshot of an enable/disable log menu command according to one embodiment.

FIG. 28 is one embodiment of a screenshot of an enable/disable log menu command. As shown, cascading drop-down lists lead from the menu choice "KM Commands", to "AccessLog", to "Enable/Disable Log". In one embodiment, this series of menus is displayed when the user right-clicks a pointing device (e.g., a mouse) on the NWS_LOGS entry in the listing on the left side of the PATROL management console in FIG. 28.

Figure 29A:
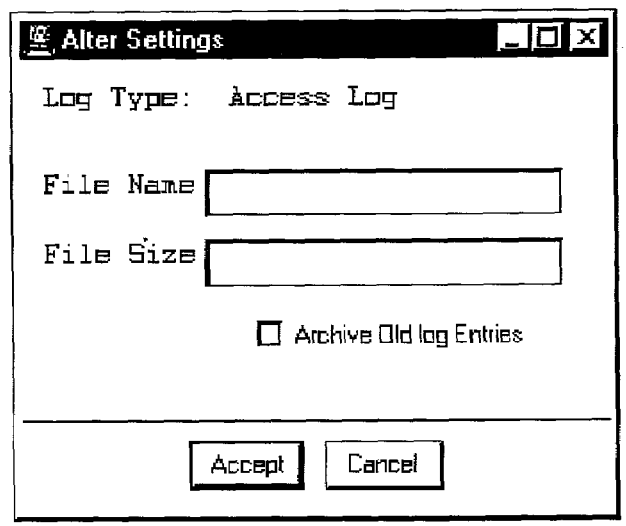
FIG. 29A is a screenshot of an alter settings dialog for an access log according to one embodiment.

FIG. 29A is one embodiment of a screenshot of an alter settings dialog for an access log. Similar alter settings dialogs may be displayed for the various other logs (e.g., admin log, error log, servlet log, and bearer log). The two entry fields (i.e., File Name and File Size) shown in FIG. 29A are free-form fields. There also is a check-box to archive old log entries, if desired. If the user selects the Accept PushButton after filling in the two entry fields, subsequent access log entries will be written to the specified file, up to the specified maximum file size. It is noted that the dialog shown in FIG. 29A may be displayed when the menu command "Alter settings" is chosen (rather than Enable/Disable Log) in FIG. 28.

Figure 29B:
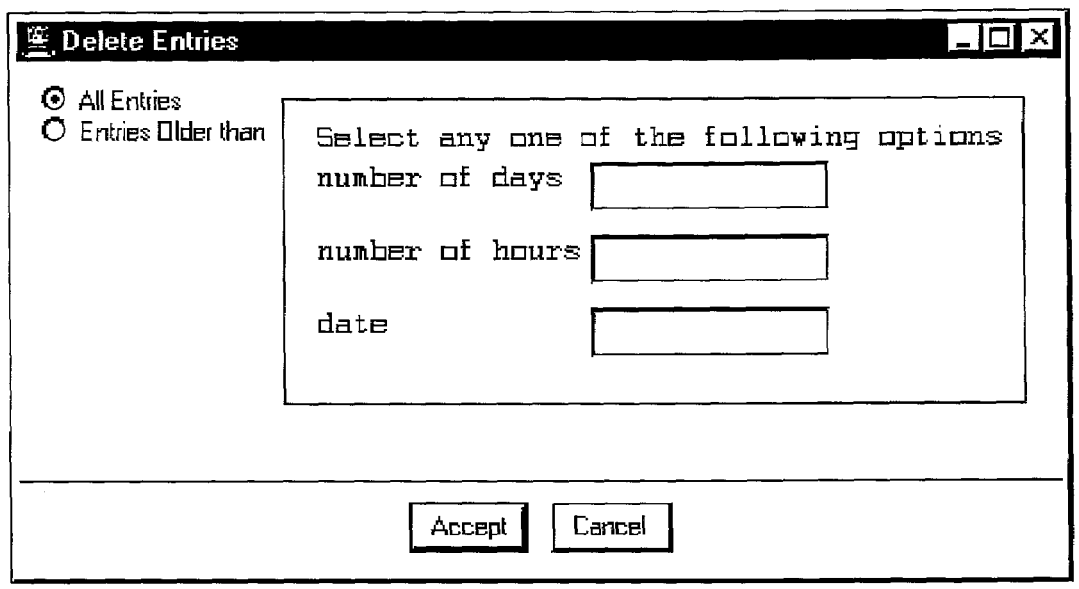
FIG. 29B is a screenshot of a delete entries dialog according to one embodiment.

FIG. 29B is one embodiment of a screenshot of a delete entries dialog. Similar delete entries dialogs may be displayed for the various other logs (e.g., admin log, error log, servlet log, and bearer log). The three entry fields (i.e., number of days, number of hours, and date) shown in FIG. 29B are free-form fields, however, an entry in one of the entry fields will disable the other two entry fields, as indicated. There also are two radio buttons: delete "all entries" and delete "entries older than". If the user selects the delete "all entries" radio button, the three entry fields are disabled; conversely, if the user selects the delete "entries older than" radio button, the three entry fields are enabled. If the user selects the Accept PushButton after either selecting the delete "all entries" radio button, or selecting the delete "entries older than" radio button and filling in one of the three entry fields, then the requested log entries for the chosen log will be deleted. It is noted that the dialog shown in FIG. 29B may be displayed when the menu command "Clear Log Settings" is chosen (rather than Enable/Disable Log) in FIG. 28.

FIG. 30 is one embodiment of a screenshot listing various log parameters for NWS_LOGS. The following items are shown in FIG. 30, along with their values: History Retention: 1 day(s); Worst Parameter: undefined; Default username: undefined; Application class: NWS_LOGS; State: OK; Icon Type: Application. Additionally, the following items (preceded by a check mark) are shown in FIG. 30, along with their values: AccessLog Filesize: 10240; AccessLog FileName: access; AdminLog FileName: admin; AdminLog Filesize: 10240; BearerLog FileName: bearer; BearerLog Filesize: 10240; ErrorLog FileName: error; ErrorLog Filesize: 10240; KM Version: Ver. 1.0; ServletLog FileName: servlet; ServletLog Filesize: 10240.

Figure 31:
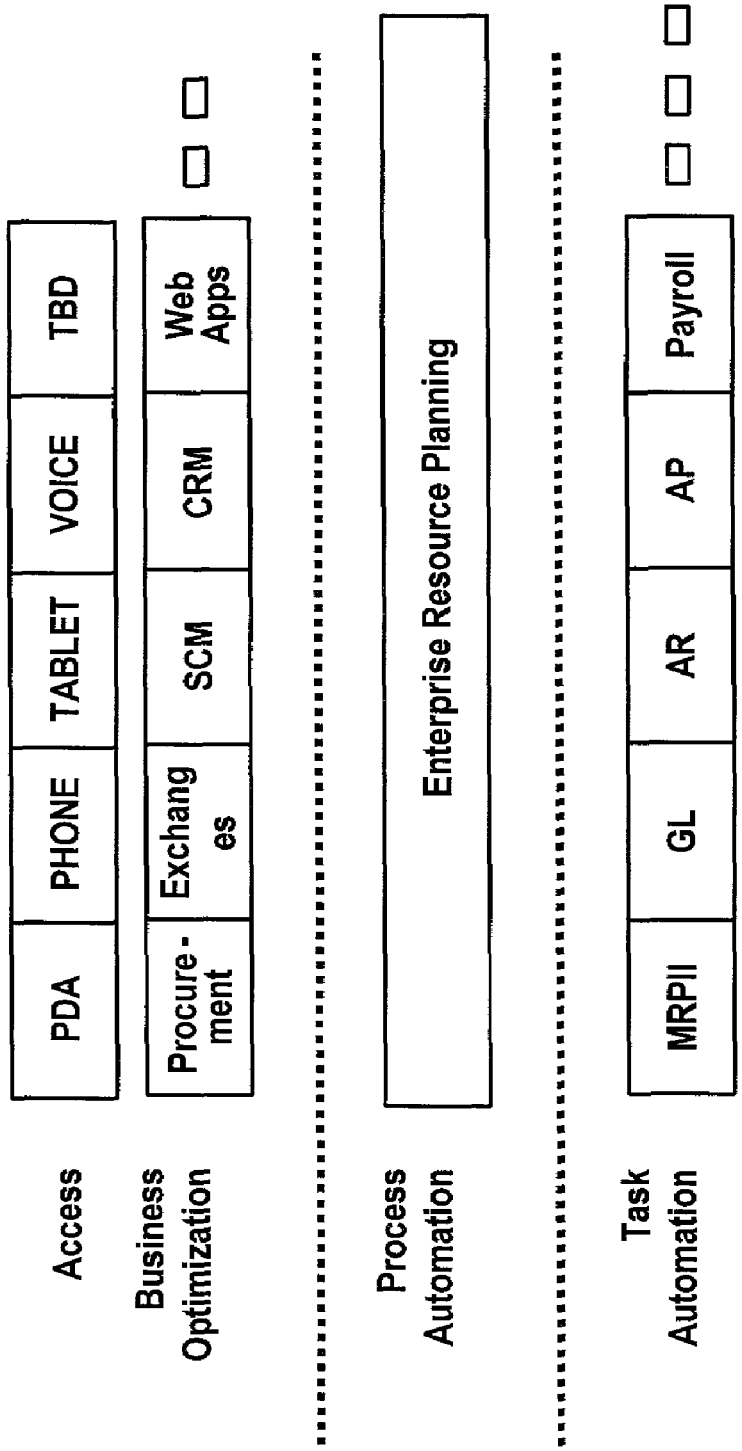
FIG. 31 illustrates optimization of transactions, interactions, and information according to one embodiment.

FIG. 31—Optimization

FIG. 31 illustrates one embodiment of optimization of transactions, interactions, and information.

There are a myriad of types of access available to business applications, particularly to e-business (electronic business), e-commerce, and m-commerce applications. These types of access may include: PDAs, mobile phones, wireless tablets, voice access to web data, along with access types not yet developed.

Businesses may optimize various processes through the use of wireless services. The processes that may be optimized include, but are not limited to: procurement, exchanges, customer account access, supply chain management (SCM), customer relationship management (CRM), warehouse inventory applications, package delivery applications, other web applications.

Process automation, through the use of enterprise resource planning (ERP) and/or other techniques, may be enhanced and/or optimized using the types of access noted above. Similarly, task automation (e.g., manufacturing resource planning (MRP or MRPII), general ledger (GL), accounts receivable (AR), accounts payable (AP), payroll, among others) may also be enhanced and/or optimized using the types of access noted above.

FIG. 32—WWW Model

Figure 32:
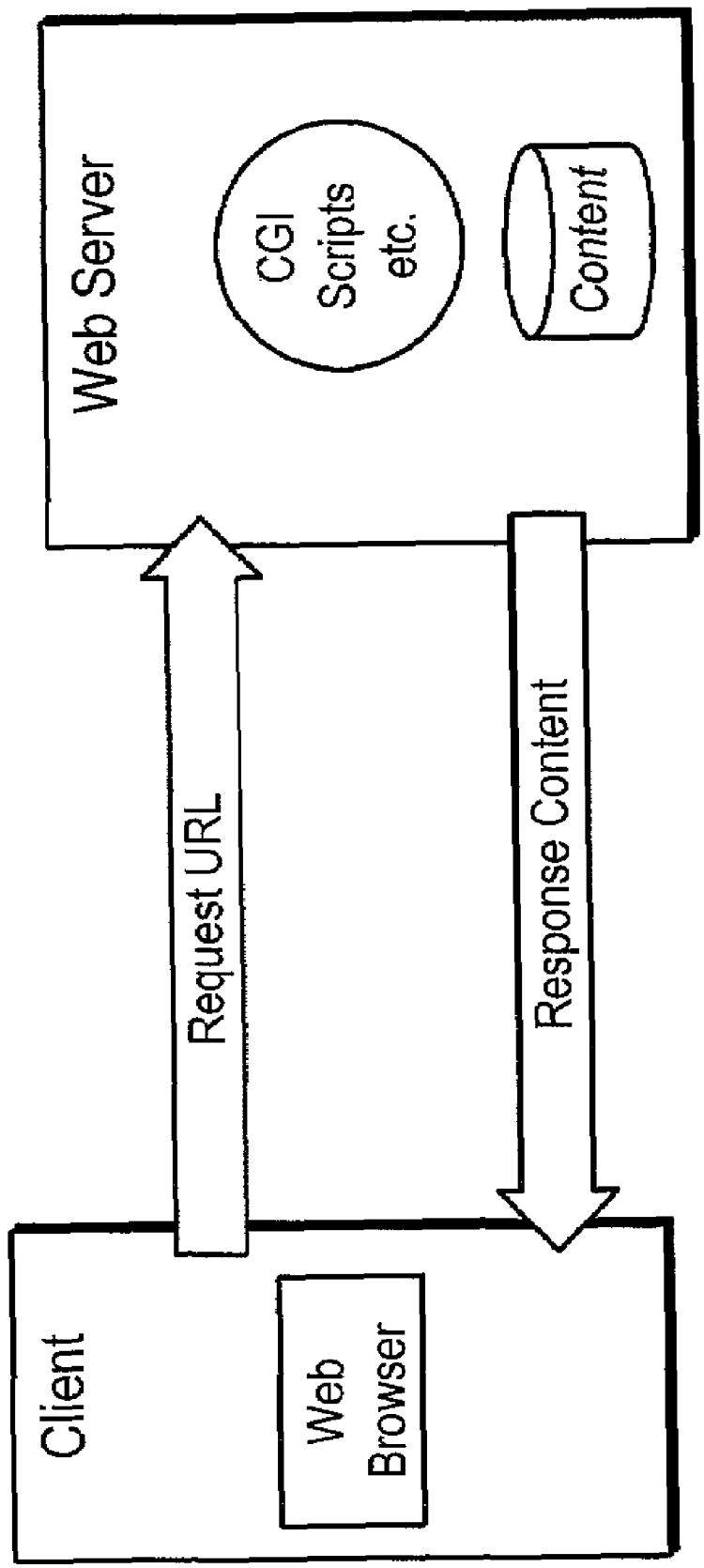
FIG. 32 illustrates client-server interaction using a WWW model according to one embodiment.

FIG. 32 illustrates one embodiment of client-server interaction using a World Wide Web (WWW) model.

As shown, the client may use a web browser to request a URL from a web server. The web server may use a variety of tools (e.g., CGI scripts) to manipulate and manage content. The web server may respond to the URL request with content in a form accessible and/or readable by the platform or computer system (e.g., a personal computer system, a mainframe computer system, a workstation, a network appliance, an Internet appliance, a personal digital assistant (PDA), a mobile phone, a cellular phone, a wireless phone, a pager, a wireless communications device, a television system, a communications device, among others) that the client is using.

FIG. 33—WAP Model

Figure 33:
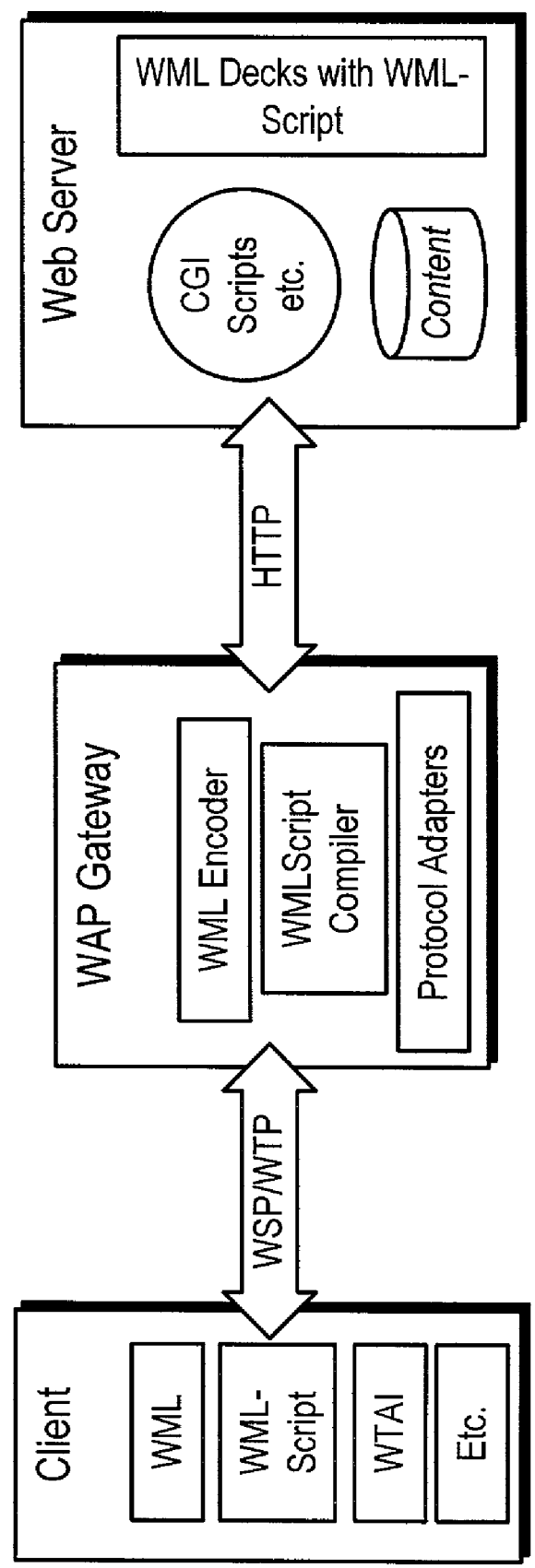
FIG. 33 illustrates client-server interaction using a WAP model according to one embodiment.

FIG. 33 illustrates one embodiment of client-server interaction using a WAP model.

As shown, the client may use any number of methods to browse the web (e.g., Wireless Markup Language (WML), WML-Script, Wireless Telephony Applications Interface (WTAI), among others) to request data from a web server. The client data request is first sent to a WAP gateway via Wireless Session Protocol/Wireless Transfer Protocol (WSP/WTP). One of the functions of the WAP gateway is to encode/decode/compress messages that pass to and from a wireless device and a web server. The WAP gateway may use a variety of tools (e.g., WML Encoder, WML-Script Compiler, Protocol Adapters, among others) to encode/decode/compress the messages that pass to and from a wireless device and a web server.

The web server may communicate with the WAP gateway using Hypertext Transfer Protocol (HTTP). Further, the web server may use a variety of tools (e.g., CGI scripts, WML decks with WML-Script) to manipulate and manage content. The web server may respond to the data request with content in a form accessible and/or readable by the platform or computer system (e.g., a personal computer system, a mainframe computer system, a workstation, a network appliance, an Internet appliance, a personal digital assistant (PDA), a mobile phone, a cellular phone, a wireless phone, a pager, a wireless communications device, a television system, a communications device, among others) that the client is using.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system for management of wireless communication, the system comprising:
   a plurality of managed servers for wireless communication, wherein the managed servers are operable to provide wireless services for one or more clients using a wireless protocol to access one or more targets in communication with the managed servers;
   a plurality of agents executable at the managed servers and gathering information about the managed servers; and
   a management console coupled to the plurality of servers and receiving the gathered information about the managed servers from the agents executable at the managed servers, wherein the management console is operable to provide integrated management of the plurality of managed servers based on the gathered information.

2. The system of claim 1, wherein the wireless protocol comprises Wireless Application Protocol (WAP).

3. The system of claim 1, wherein the agents gather information about execution of the managed servers and provide the gathered information to the management console.

4. The system of claim 3, wherein the management console is operable to display the gathered information regarding the execution of the plurality of managed servers.

5. The system of claim 3, wherein the management console is operable to display gathered information regarding the execution of individual servers of the plurality of managed servers.

6. The system of claim 1, wherein the agents gather information about execution of the wireless services provided by the managed servers and provide the gathered information to the management console.

7. The system of claim 6, wherein the management console is operable to display the gathered information regarding the execution of the wireless services provided by the plurality of servers.

8. The system of claim 6, wherein the management console is operable to display the gathered information regarding the execution of the wireless services provided by individual servers of the plurality of servers.

9. The system of claim 1, wherein the integrated management of the managed servers is selected from the group consisting of managing logs, managing bearers, managing access to the managed servers, displaying topology of components of the managed servers, displaying attributes of the managed servers, controlling traffic of the managed servers, starting the managed servers, initiating a recovery routine for the managed servers, restarting the managed servers running on the same host as one of the agents, shutting down the managed servers, altering settings for session and thread settings for the managed servers, altering settings for thread pool and session cache size for the managed servers, cleaning up session data kept in a database for the managed servers, installing licenses for the managed servers, providing statistical counters maintained by the managed servers and gathered by a knowledge module of one of the agents, and enabling snapshot logging of statistical counters of the managed servers to an access log.

10. A method for managing wireless communication, the method comprising:
    providing wireless services for one or more client to access one or more targets in communication with the managed servers, wherein the wireless services are provided by a plurality of managed servers using a wireless protocol;
    gathering information about the managed servers using a plurality of agents executable at the managed servers;
    receiving the gathered information about the managed servers from the agents at a management console; and
    providing integrated management of the plurality of managed servers using the management console based on the gathered information.

11. The method of claim 10, wherein gathering information comprises:
    gathering information related to execution of each respective server of the plurality of managed servers using a corresponding respective agent of the plurality of agents; and
    providing the gathered information to the management console.

12. The method of claim 11, wherein the management console is operable to display the gathered information regarding the execution of the plurality of managed servers.

13. The method of claim 11, wherein the management console is operable to display the gathered information regarding the execution of individual servers of the plurality of managed servers.

14. The method of claim 10, wherein gathering information comprises:
    gathering information related to execution of the wireless services provided by each respective server of the plurality of managed servers using a corresponding respective agent of the plurality of agents; and
    providing the gathered information to the management console.

15. The method of claim 14, wherein the management console is operable to display the gathered information regarding the execution of the wireless services provided by the plurality of managed servers.

16. The method of claim 14, wherein the management console is operable to display the gathered information regarding the execution of the wireless services provided by individual servers of the plurality of managed servers.

17. The method of claim 10, wherein the wireless protocol comprises Wireless Application Protocol (WAP).

18. The method of claim 10, wherein the integrated management of the managed servers is selected from the group consisting of managing logs, managing bearers, managing access to the managed servers, displaying topology of components of the managed servers, displaying attributes of the managed servers, controlling traffic of the managed servers, starting the managed servers, initiating a recovery routine for the managed servers, restarting the managed servers running on the same host as one of the agents, shutting down the managed servers, altering settings for session and thread settings for the managed servers, altering settings for thread pool and session cache size for the managed servers, cleaning up session data kept in a database for the managed servers, installing licenses for the managed servers, providing statistical counters maintained by the managed servers and gathered by a knowledge module of one of the agents, and enabling snapshot logging of statistical counters of the managed servers to an access log.

19. A programmable storage device which stores program instructions, wherein the program instructions are executable by a programmable control device to:
 gather information about managed servers using a plurality of agents executable at the managed servers, wherein the managed servers provide wireless services to one or more clients, using a wireless protocol to access one or more targets in communication with the managed servers;
 receive the gathered information about the managed servers from the agents at a management console; and
 provide integrated management of the plurality of managed servers using the management console based on the gathered information.

20. The programmable storage device of claim 19, wherein the wireless protocol comprises Wireless Application Protocol (WAP).

21. The programmable storage device of claim 19, wherein to gather information, the program instructions are further executable to:
 gather information related to execution of each respective server of the plurality of servers using a corresponding respective agent of the plurality of agents; and
 provide the gathered information to the management console.

22. The programmable storage device of claim 21, wherein the management console is operable to display the gathered information regarding the execution of the plurality of servers.

23. The programmable storage device medium of claim 21, wherein the management console is operable to display the gathered information regarding the execution of individual servers of the plurality of servers.

24. The programmable storage device of claim 19, wherein to gather information, the program instructions are further executable to:
 gather information related to execution of the wireless services provided by each respective server of the plurality of managed servers using a corresponding respective agent of the plurality of agents; and
 provide the gathered information to the management console.

25. The programmable storage device of claim 24, wherein the management console is operable to display the gathered information regarding the execution of the wireless services provided by the plurality of managed servers.

26. The programmable storage device of claim 24, wherein the management console is operable to display the gathered information regarding the execution of the wireless services provided by individual servers of the plurality of managed servers.

27. The programmable storage device of claim 19, wherein the integrated management of the managed servers is selected from the group consisting of managing logs, managing bearers, managing access to the managed servers, displaying topology of components of the managed servers, displaying attributes of the managed servers, controlling traffic of the managed servers, starting the managed servers, initiating a recovery routine for the managed servers, restarting the managed servers running on the same host as one of the agents, shutting down the managed servers, altering settings for session and thread settings for the managed servers, altering settings for thread pool and session cache size for the managed servers, cleaning up session data kept in a database for the managed servers, installing licenses for the managed servers, providing statistical counters maintained by the managed servers and gathered by a knowledge module of one of the agents, and enabling snapshot logging of statistical counters of the managed servers to an access log.

* * * * *